US009130980B2

(12) United States Patent
Law et al.

(10) Patent No.: US 9,130,980 B2
(45) Date of Patent: Sep. 8, 2015

(54) INTEGRATED UNIFIED THREAT MANAGEMENT FOR A PROCESS CONTROL SYSTEM

(75) Inventors: Gary Keith Law, Georgetown, TX (US); Nate Kube, Vancouver (CA); Robert Kent Huba, Georgetown, TX (US); Brandon Hieb, Cedar Park, TX (US); David R. Denison, Austin, TX (US); Cheyenne Hernandez, Quezon (PH)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 374 days.

(21) Appl. No.: 12/889,235

(22) Filed: Sep. 23, 2010

(65) Prior Publication Data

US 2011/0072506 A1    Mar. 24, 2011

Related U.S. Application Data

(60) Provisional application No. 61/245,496, filed on Sep. 24, 2009.

(51) Int. Cl.
*G06F 21/00* (2013.01)
*H04L 29/06* (2006.01)

(52) U.S. Cl.
CPC ........ *H04L 63/1416* (2013.01); *H04L 63/0227* (2013.01)

(58) Field of Classification Search
CPC ................. H04L 63/1416; H04L 63/0227
USPC ........... 726/11, 3, 23; 709/224, 230; 713/171, 713/201
See application file for complete search history.

(56) References Cited

U.S. PATENT DOCUMENTS 7,966,659 B1 *  6/2011  Wilkinson et al. ............... 726/22
8,132,248 B2 *  3/2012  Trojanowski ................... 726/11
(Continued)

FOREIGN PATENT DOCUMENTS

JP   2001-202324 A    7/2001
JP   2002-341906 A    11/2002
(Continued)

OTHER PUBLICATIONS

Search Report for Application No. GB1015884.8, dated Jan. 18, 2011.
(Continued)

*Primary Examiner* — Shewaye Gelagay
*Assistant Examiner* — Kendall Dolly
(74) *Attorney, Agent, or Firm* — Marshall, Gerstein & Borun LLP

(57) ABSTRACT

A Unified Threat Management System (UTMS) for securing network traffic in a process control system may comprise network devices configured to receive network traffic related to the process control system and including a ruleset received from an external source. The ruleset may include one or more rules defining a condition to accept or deny the network traffic received at the network device. The state of the network device may be integrated into the process control system as a process control object or variable, thus allowing the state and other UTMS and component network device parameters and variables to be displayed to an operator at a workstation within a graphical process control system environment. The network devices may also communicate with a perpetual service that proactively supplies the devices with rulesets to meet the latest security threats, threat patterns, and control system vulnerabilities found or predicted to exist within the network.

59 Claims, 21 Drawing Sheets

(56) References Cited

U.S. PATENT DOCUMENTS

| | | | |
|---|---|---|---|
| 8,595,831 B2* | 11/2013 | Skare | 726/22 |
| 2005/0273849 A1* | 12/2005 | Araujo et al. | 726/12 |
| 2006/0294579 A1* | 12/2006 | Khuti et al. | 726/3 |
| 2007/0199061 A1 | 8/2007 | Byres et al. | |
| 2007/0294369 A1* | 12/2007 | Ginter et al. | 709/217 |
| 2008/0066004 A1 | 3/2008 | Blevins et al. | |

FOREIGN PATENT DOCUMENTS

| | | |
|---|---|---|
| JP | 2009-003926 A | 1/2009 |
| WO | WO-03/102705 A1 | 12/2003 |
| WO | WO-2006/031302 A2 | 3/2006 |
| WO | WO 2006031302 A2 * | 3/2006 |
| WO | WO-2007/079033 A2 | 7/2007 |

OTHER PUBLICATIONS

First Office Action for Chinese Application No. 201010569843.5, dated Jun. 27, 2014.
Notice of Reasons for Rejection for Japanese Application No. 2010-213661, dated Jul. 15, 2014.
Examination Report for Application No. GB1015884.8 dated Jan. 30, 2015, 3 pgs.
Decision of Refusal for Japanese Application No. 2010-213661, dated Apr. 7, 2015.
Second Office Action for Chinese Application No. 201010569843.5, dated May 11, 2015.

* cited by examiner

1400

| ☑ | "Alert on terminal server session creation?" |
| ☐ | "Alert on excessive outbound traffic of _____ message packets per second on port ___?" |
| ☑ | "Alert on excessive inbound traffic of _____ message packets per second on port ___?" |
| ☐ | "Alert you using equipment by manufacturer Alpha?" —1402 |
| ☑ | "Alert you using equipment by manufacturer Beta?" —1404 |
| . . . | . . . |

UTMS Device Command Center — 1700

Tools  Help

DeltaV System
- Decommissioned UTMS Device
  - P Primary Network
    - 00-15-65-EF-23-09
    - 00-15-65-EF-24-09
  - S Secondary Network
    - 00-17-14-74-AB-04
- Commissioned UTMS Device
  - P Primary Network
    - SX_CENTER_PRI_$X — 2304
    - SX_LN2_PRIO3_$X
    - SX_LN2_PRIO4_$X
    - SX_PKG_PRIO2_$X
    - SX_RMS_PRIO3_$X
    - SX_UTL_PRIO1_$X
  - S Secondary Network

2306

SX_CENTER_PRI_SX — 1748

Last 60 Seconds — 1720

Alarms — 1716

| | | Value | Description |
|---|---|---|---|
| | COMM | 2302 | Determines if a COMM alarm is active on the device or not |
| | FAILED | ▽ 2306 | Determines if a FAILED alarm is active on the device or not |
| | MAINT | | Determines if a MAINT alarm is active on the device or not |
| | ADVISE | 2308 | Determines if a FAILED alarm is active on the device or not |

Current Status

| | | Value | Description |
|---|---|---|---|
| | Power Supply 1 | Good | Status of power supply 1 |
| | Power Supply 2 | Unavailable | Status of power supply 2 |
| | Chassis Temperature | 30 degree C | Device chassis temperature |
| | Signal Relay | Open (Error) | Specifies whether signal relay is activated on the device or not |
| | Last Update | 6:58:37 PM | Date/Time when the information from the device was last upd... 2310 |

Device Information

| | | Value | Description |
|---|---|---|---|
| | Description | MD20 switch: Blog C, ... | Description about the device |
| | Model | | Product model |
| | Hardware Revision | | Device hardware version |
| | Software Revision | 04.03.3 | Device software version |

| Port | Enabled | Node Name | Port Lock Address | Port Locking Violation |
|---|---|---|---|---|
| 1.1 | Yes | SX_LN2_PRI_SX | 10.4.128.120 | No |
| 1.2 | Yes | (Idle) | | No |
| 1.3 | Yes | PRO_PLUS | 10.4.128.4 | No |
| 1.4 | No | APP_STA1 | 10.4.128.5 | No |
| 1.5 | Yes | | (None) | No |
| 1.6 | Yes | (One active) | 00-54-12-78-EF-12 | No |
| 1.7 | Yes | OP_STA1_SX | 10.4.128.99 | No |
| 1.8 | No | | (None) | |

Done — 1702

INTEGRATED UNIFIED THREAT MANAGEMENT FOR A PROCESS CONTROL SYSTEM

PRIORITY INFORMATION

This application claims the benefit of U.S. Provisional Application No. 61/245,496 filed on Sep. 24, 2009 entitled "INTEGRATED UNIFIED THREAT MANAGEMENT FOR A PROCESS CONTROL SYSTEM" and is entirely incorporated by reference herein.

FIELD OF TECHNOLOGY

This application relates generally to process plant control systems and, more particularly, to a method and apparatus for network threat management in a process control or plant environment.

DESCRIPTION OF THE RELATED ART

Process control systems, such as distributed or scalable process control systems like those used in power generation, chemical, petroleum, or other processes, typically include one or more controllers communicatively coupled to each other, to at least one host or operator workstation via a process control network and to one or more field devices via analog, digital or combined analog/digital buses. Field devices, which may be, for example valves, valve positioners, switches and transmitters (e.g., temperature, pressure and flow rate sensors), perform functions within the process or plant such as opening or closing valves, switching devices on and off and measuring process parameters. The controller receives signals indicative of process or plant measurements made by the field devices and/or other information pertaining to the field devices, uses this information to implement a control routine and then generates control signals which are sent over the buses to the field devices to control the operation of the process or plant. Information from the field devices and the controller is typically made available to one or more applications executed by the operator workstation to enable an operator to perform any desired function with respect to the process or plant, such as viewing the current state of the plant, modifying the operation of the plant, etc. Together, the field device information and the operator workstation applications make up the operator control environment.

The process controllers, which are typically located within the process plant environment, receive signals indicative of process measurements or process variables made by or associated with the field devices and/or other information pertaining to the field devices, and execute controller applications. The controller applications implement, for example, different control modules that make process control decisions, generate control signals based on the received information, and coordinate with the control modules or blocks in the field devices such as HART® and FOUNDATION Fieldbus® field devices. The control modules in the process controllers send the control signals over the communication lines or signal paths to the field devices, to thereby control the operation of the process.

Information from the field devices and the process controllers is typically made available to one or more other hardware devices such as, for example, operator workstations, maintenance workstations, personal computers, handheld devices, data historians, report generators, centralized databases, etc., via the process control network. The information communicated over the network enables an operator, maintenance person, or other user to perform desired functions with respect to the process. For example, the information allows an operator to change settings of the process control routine, modify the operation of the control modules within the process controllers or the smart field devices, view the current state of the process or status of particular devices within the process plant, view alarms generated by field devices and process controllers, simulate the operation of the process for the purpose of training personnel or testing the process control software, diagnose problems or hardware failures within the process plant, etc.

As an example, the DeltaV™ control system, sold by Emerson Process Management includes multiple applications stored within and executed by different devices located at diverse places within a process plant. A configuration application, which resides in one or more operator workstations, enables users to create or change process control modules and download these process control modules via a data highway to dedicated distributed controllers. Typically, these control modules are made up of communicatively interconnected function blocks, which are objects in an object oriented programming protocol. These function blocks perform functions within the control scheme based on inputs thereto and also provide outputs to other function blocks within the control scheme. The configuration application may also allow a designer to create or change operator interfaces which are used by a viewing application to display data to an operator and to enable the operator to change settings, such as set points, within the process control routine. Each dedicated controller and, in some cases, field devices, stores and executes a controller application that runs the control modules assigned and downloaded thereto to implement actual process control functionality. The viewing applications, which may be run on one or more operator workstations, receive data from the controller application via the data highway and display this data to process control system designers, operators, or users using the user interfaces, and may provide any of a number of different views of the process control routine or module, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

As the number and type of control and support applications used in a process control environment have increased, different graphical display applications have been provided to enable users to effectively configure and use these applications. For example, graphical display applications have been used to support control configuration applications to enable a configuration engineer to graphically create control programs to be downloaded to the control devices within a process plant. Additionally, graphical display applications have been used to enable operators to view the current functioning of the process plant or areas of the process plant, to enable maintenance personnel to view the state of hardware devices within the process plant, to enable simulation or management of the process plant, etc., as described in U.S. patent application Ser. No. 10/574,824 entitled "A PROCESS PLANT USER INTERFACE SYSTEM HAVING CUSTOMIZED PROCESS GRAPHIC DISPLAY LAYERS IN AN INTEGRATED ENVIRONMENT" the entire disclosure of which is expressly incorporated by reference herein.

The DeltaV™ control system may also include a user interface system or environment with a computer-readable medium, a display device, and an object having information stored in the computer-readable medium regarding operation of a process plant element, device, etc. An execution engine of the user interface system utilizes the object information in a runtime environment to generate content for a plurality of content layers of a process graphic display. The display device then depicts a specified content layer of the plurality of content layers. The object information includes runtime data from the process plant in connection with on-line operation of the process plant element or device. Each user's profile includes an indication for access by job description (e.g., operator, maintenance, supervisor, trainer, guest, etc.) and a content layer of the user interface displays a customized depiction of the runtime data in a content layer for each user.

The field devices within the process control system communicate with the hardware devices over the process control network, for example, an Ethernet-configured LAN. The network relays the process parameters, network information, and other process control data from the elements and devices through various network devices and to various entities in the process control system. Typical network devices include network interface cards, network switches, routers, firewalls, controllers, and operator workstations. The network devices typically facilitate the flow of data through the network by controlling its routing, frame rate, timeout, and other network parameters, but do not change the process data itself. While information from the field devices and the process controllers is made available to operator and maintenance workstations in the control environment executing on the workstations, information from the network devices (e.g., configuration, status, state, etc.) is not integrated into the process control system as a process variable and is, therefore, not available in the control environment. Management and control of the network devices is separate from management of the field devices and process variables.

As the process control network grows in size and complexity, the number and type of network devices correspondingly increases. Also, as more and more process systems and the plants themselves become distributed (e.g., different steps of the process are executed, monitored, controlled, etc., in physically separate locations), the process control network incorporates more communication using Wide Area Networks generally and the Internet Protocol Suite in particular to incorporate the various LANs at each process control site or even individual operator workstations in disparate locations. As a result of system and network growth, network security and management of these complex, distributed process control systems has become increasingly difficult. Any external connection into a process control system network presents a possible point of attack into the system.

Network devices such as firewalls typically provide security for process control networks and mitigate the risk of network attacks. Firewalls are designed to block network traffic that is not authorized to access one or more portions of the network. Firewalls typically contain one or more rulesets that filter unauthorized communication from various other network devices or network locations. Two general categories of rulesets include Policy Based and Signature Based rulesets. Policy Based rulesets define various restrictions on network communication based on IP addresses, ports, communication rates, and other conditions under which general types of communication are permitted. Policy based rulesets may also define what functions and services the network will allow to provide communication between network nodes. A policy based ruleset firewall can also dynamically permit communication to random IP addresses. Policy-based systems typically look solely at the source and destination ports of each packet to establish a match with the ruleset and drop each matching packet. Signature based rulesets include specific malicious patterns and block any traffic that matches those patterns by examining the contents of each packet for comparison against the signature ruleset. For example, the signature-based system may include a ruleset to compare a received packet payload against known threats (viruses, worms, etc.), malformed protocol payloads, etc., or may be configured to drop packets based on known vulnerabilities of specific devices within the network.

Typical firewalls require detailed configuration of their rulesets. Some firewalls implement a "default-deny" type of firewall ruleset, in which the only connections the firewall allows are those that have been explicitly allowed by the ruleset. Default-deny rulesets require detailed understanding of the network applications and endpoints required for the process control system's day-to-day operation. Of course, any modification of the system by adding or removing a network component will also require modification of the default-deny ruleset. Another option is a "default-allow" ruleset in which all traffic is allowed unless it has been specifically blocked. Default-allow configured rulesets, while easily implemented, make inadvertent network connections and unwanted system security compromises much more likely.

As the process control system and various sub-systems evolve, the firewall rulesets must also change to meet any additional security requirements of new devices, software updates, and any other network changes. The field devices and process control system software, just like any other software, may contain errors requiring the installation of patches and other fixes. Each time the system is changed (e.g., by the addition of new devices or software, patches to fix old software, changes to network configuration, updates, etc.), that change could potentially expose the network to risk.

In a typical IT environment, regular and consistent patching with concomitant network down time allows the network to remain secure. In an industrial context, however, system or plant downtime is not feasible and typically incurs significant costs. Scheduling regular patches during planned downtime is one solution, but often exposes the system to risk if the threat is recognized too early before the scheduled downtime. End users are, thus, forced to choose between continued exposure to network threats or plant interruption. Continual patching to update the firewall as new threats are identified provides some protection, but cannot typically protect against "zero day" application layer attacks where the threat is unknown until it actually occurs. Further, because network devices are not integrated into the process control system, information from the firewall is not available to plant operators and other plant personnel. Firewall tasks such as configuration, ruleset patching, and regular maintenance are left to IT personnel only.

In some particularly high-risk or sensitive process control systems (e.g., nuclear reactors, high-energy processes, major metropolitan area power grids, military and government applications, etc.), restrictive connection policies may demand that all external network connections be completely secure. In practice, these sensitive process control systems have resorted to physically disconnecting all external connections from the network when they are not in use. However, since physically disconnecting external connections is not integrated into the process control system as an object that may be represented within a graphical interface, as described above, it is difficult if not impossible for operators to control the state of the connection (i.e., whether or not the device or system the operator controls is physically connected to an external entity) or to even know whether or not the connection is active from their operator workstations.

Some commercial off-the-shelf (COTS) firewall systems and other network devices are able to provide a partial solution to network security, but still must be managed outside of the operator environment. COTS firewalls are managed by IT personnel specifically trained to integrate the firewall into the needs of the process control system and configure the various rulesets as described above. Even so, COTS firewall systems have a number of disadvantages. For example, the "end of life" for the firewall is controlled by the manufacturer, not the user or by plant floor personnel, which may lead to an unexpected product replacement, lack of manufacturer support, and plant downtime. Further, IT personnel are still required to update the ruleset when new threats are discovered or upgrades to software components of the system are implemented. In a process control system, each ruleset is specific to the system it protects; changes to the system require changes to the rulesets. IT personnel, who are not typically trained to understand the process control system and its upgrades, may not understand how or why the rulesets must also be changed. If left solely as a stand-alone application managed by IT personnel, the rulesets may inadvertently provide less protection for the system than desired. For example, administration, configuration, and management of the firewall typically requires IT personnel to have detailed knowledge of the network architecture that is to be protected. IT personnel for process control networks typically need to understand the network topography, network business needs related to the network, permitted devices and services that the business requires within and between local networks, and the various external entities that should be permitted to access the local networks. Example internal entities may include multiple workstations within a business that have access to shared file servers and applications. Example external entities may include laptops, workstations, and other communication devices not physically connected to the one or more local networks. Such external entities may be associated with, for example, salespeople that are traveling and require connectivity to sensitive or proprietary nodes of their business network.

For circumstances in which IT personnel are responsible for protecting networks associated with a control system, the personnel must typically understand which control system devices are permitted to access external network resources and which external network resources are permitted to access the control system devices. Some control systems (e.g., a process control system in a manufacturing plant, test and measurement applications/equipment, etc.) include one or more controllers, such as a DeltaV™ controller sold by Fisher-Rosemount Systems, Inc., an Emerson Process Management™ company. The controller may connect to a network and have a designated IP address, one or more communication ports, one or more slots to accommodate input/output (I/O) devices and/or field devices, and/or one or more I/O channels. For some control systems, multiple controllers may be employed, each having a unique IP address with corresponding ports, slots, and/or I/O channels. As such, IT personnel must typically know the IP address of each controller and/or each device connected to the controller, such as field devices (e.g., smart field devices), thermocouples, and/or other devices (e.g., light shields, pressure gauges, pressure transducers, current transducers, etc.).

In addition to IT personnel having the responsibility of understanding the control system topology and addresses for each control system device, IT personnel must typically set rules and/or access privileges for each of the devices that comprise one or more control systems. Rules may include, but are not limited to, allowing internal network communications between identified devices within the control system, blocking communications from one or more control system devices within the control system, blocking originating communications from one or more control system devices having external destination IP addresses, setting one or more communication volume thresholds, and setting communication protocol rules (e.g., a smart field device is not allowed to initiate communications within the control system network unless first requested by a master device).

Additionally, because control system devices and associated communication protocols used by such devices may include unique and device-specific features, IT personnel typically need to understand details related to control system communications that should be allowed or blocked based on such features. For example, some control systems employ a communication protocol known as Highway Addressable Remote Transducer (HART). HART communications employ a bi-directional industrial field communication protocol that is typically used to implement communications between intelligent field instruments and/or host systems. The host systems, such as DeltaV™ controllers, communicate with field devices for many reasons including device configuration, device diagnosis, device troubleshooting, receiving device process measurement values, and determining device health status information. HART devices are normally only allowed to communicate on a HART communication network after first being interrogated by the host (such as a DeltaV™ controller). Another communication feature of the HART communication protocol includes the ability to facilitate a secondary host (e.g., a primary master and a secondary master, each of which may communicate with the field devices). If IT personnel that configure the firewall are unaware of such device and protocol-specific features, the firewall may fail to accommodate for such communication activities that are deemed acceptable or particularly risk-prone. For example, some field devices may be configured in a control system to receive measurement data from a transducer and report the collected measurement data to a specific controller via a specific IP address having a specific port. In the event that the field device also initiates communication to an alternate destination (e.g., a network node, the Internet, an alternate controllers in the control system, etc.), then such activity may be considered a security risk that an operator of the process control system may not fully understand.

In other circumstances, IT personnel have limited or no detailed understanding of the control system details and how the control system is to properly function to meet control objectives (e.g., permitted control communications between controllers and devices, permitted data communications between devices, permitted firmware updates to devices, permitted external access by remote users to the control system, etc.). As such, IT personnel may be at a significant disadvantage regarding proper access controls, permission settings, and/or proper firewall rules configuration for the system. For example, an IT professional may install one or more firewall devices and/or firewall software applications to operate between a control system network boundary and an intranet and/or Internet boundary. However, such firewalls are not typically configured with rules and access permissions that account for the unique needs of the control system that would result in optimum functionality of the control system while maintaining a desired degree of network security. As a result, the IT professional may simply configure the firewall iteratively in response to complaints from control system administrators regarding communication failures and instances of improper control system operation. Such iterative efforts to configure the firewall results in workforce inefficiency, failures, lost profits, and safety risks.

One possible solution for network security is described in U.S. Patent Application Publication No. 20070199061 to Byres et al., entitled "NETWORK SECURITY APPLIANCE" and the Tofino™ system manufactured by Byres Security Inc. of Lantzville, BC. These solutions discover and identify network devices and create firewall rules to control the traffic flowing to them by automatically locating devices and generating rules by passively analyzing traffic on the network. When the solution discovers a new device, it prompts the system administrator to accept its deductions and insert the new device into the network inventory diagram, or flag the device as a potential intruder. This way, IT personnel and the network control engineer always have a current network map. While this solution ensures that IT personnel are able to quickly and accurately manage the network, the solution is still left entirely to the expertise and control of separately-trained IT personnel. Operators within a process control system would have no capability to monitor and manage process control network security from operator workstations.

SUMMARY OF THE DISCLOSURE

The security and management of process control system networks may be enhanced by providing a Unified Threat Management System (UTMS) including a UTMS-configured firewall, UTMS-configured network access device, and UTMS-configured field devices that are capable of defending against both known and "zero day" vulnerabilities and threats to control systems for both embedded, proprietary devices, and standard, commonly-used devices. The UTMS-configured firewall and/or network access devices may include stand-alone network devices located at the perimeter of the process control network, or devices or software that runs in the controllers or other internal parts of the process control system. The state of the UTMS-configured firewalls and devices is integrated into the process control system as a process control object or variable, thus allowing the state and other UTMS and component network access device parameters and variables to be viewed from an operator or other workstation. The UTMS firewalls and devices may communicate with a perpetual service that proactively supplies the UTMS-configured firewalls, network access devices, and configured controllers or field devices with rulesets to meet the latest security threats, threat patterns, and control system vulnerabilities found to exist within the network. These updates are managed from within the standard control user interface of the plant (e.g., the DeltaV™ environment) as if the UTMS in general and the UTMS-configured firewalls, network access devices, and field devices were no different than any other control system element or entity. UTMS events and the UTMS-configured firewalls and devices themselves (e.g., alarms, permissions, threat status, events, settings, state, etc.) may also be managed from within the DeltaV™ environment.

Operator displays for each component of the UTMS may be displayed within the DeltaV™ environment or another graphical process control environment to allow operators to display the current state of the connection as well as update the settings, rulesets, and other parameters or variables of the UTMS (and its firewalls, network access devices, and field devices if so configured) and perform any other process control system security tasks from the operator display or other workstation. In some embodiments, the rulesets may be created based upon continuous or periodic evaluation of the process control system itself to provide immediate system protection from identified threats. The UTMS and its various network access devices may, thus, protect the process control network from vulnerabilities that are known to exist as well as those that are predicted to exist.

In one embodiment, a method for securing network traffic in a process control system may comprise instantiating an object having a programmable interface that communicates with a particular process control system device. The object is able to access a ruleset including one or more rules defining a condition to accept or deny network traffic received at the device. The network traffic originates externally from the process control system and also seeks access to one or more of the process control system, a network device of the process control system, and a field device of the process control system. The object then determines which of the one or more rules of the ruleset to apply to the device and secures the device by applying the one or more determined rules to the device. The object then monitors the network traffic received at the secured device and, when network traffic is received, determines if the network traffic received at the secured device violates one or more of the rules applied to the secured device. If the network traffic received at the secured device violates one or more of the rules, the object denies the network traffic access and displays an alarm in an operator interface of the process control system. Alternatively, if the network traffic received at the secured device does not violate one or more of the rules, the object grants the network traffic access.

In a further embodiment, a network device for securing network traffic in a process control system may comprise a first network connector to communicate network traffic into and out of the network device, and a second network connector to communicate network traffic to a control appliance of the process control system. A ruleset at the network device may include one or more rules defining a condition to accept or deny network traffic received at the network device, where the network traffic originates externally from the process control system and seeks access to the process control system. The network device may also include comparison routine to determine if network traffic communicated into the network device violates one or more rules of the ruleset as well as a security routine to deny the network traffic access to the control appliance or another device of the process control system and to cause an alarm to be displayed in an operator interface of the process control system if the network traffic received at the first network connector violates one or more of the rules, or to communicate the network traffic to the control appliance through the second network connector if the network traffic received at the network device does not violate one or more of the rules.

In a still further embodiment, a unified threat management system (UTMS) for securing network traffic in a process control system may comprise a plurality of network devices configured to receive network traffic related to the process control system, where at least one of the network devices may be configured to receive a ruleset from a source that is external to the process control system. The ruleset may include one or more rules defining a condition to accept or deny the network traffic received at the network device. The UTMS may also include a graphical process control environment for graphically representing elements of the process control system (including the plurality of network devices) and a state of a network traffic connection to each of the plurality of network devices. The graphical process control environment may be configured to instantiate an object for each of the plurality of network devices, and each object includes a programmable interface in communication with each UTMS device to graphically represent a different network device of the plurality of network devices. Further, parameters of the plurality network devices may be displayed and configurable within the graphical process control environment. The parameters may include the state of the connection to each of the plurality of network devices, the ruleset, and a ruleset update.

BRIEF DESCRIPTION OF THE DRAWINGS

FIG. 14 is a configuration wizard user interface for presenting questions to a user of the process control system to configure the network traffic of the process control system;

FIG. 21 is a UTMS Device Command Center user interface indicating a ruleset or network security violation;

FIG. 23 is a UTMS Device Command Center user interface including an alarm.

DESCRIPTION

Figure 1A:
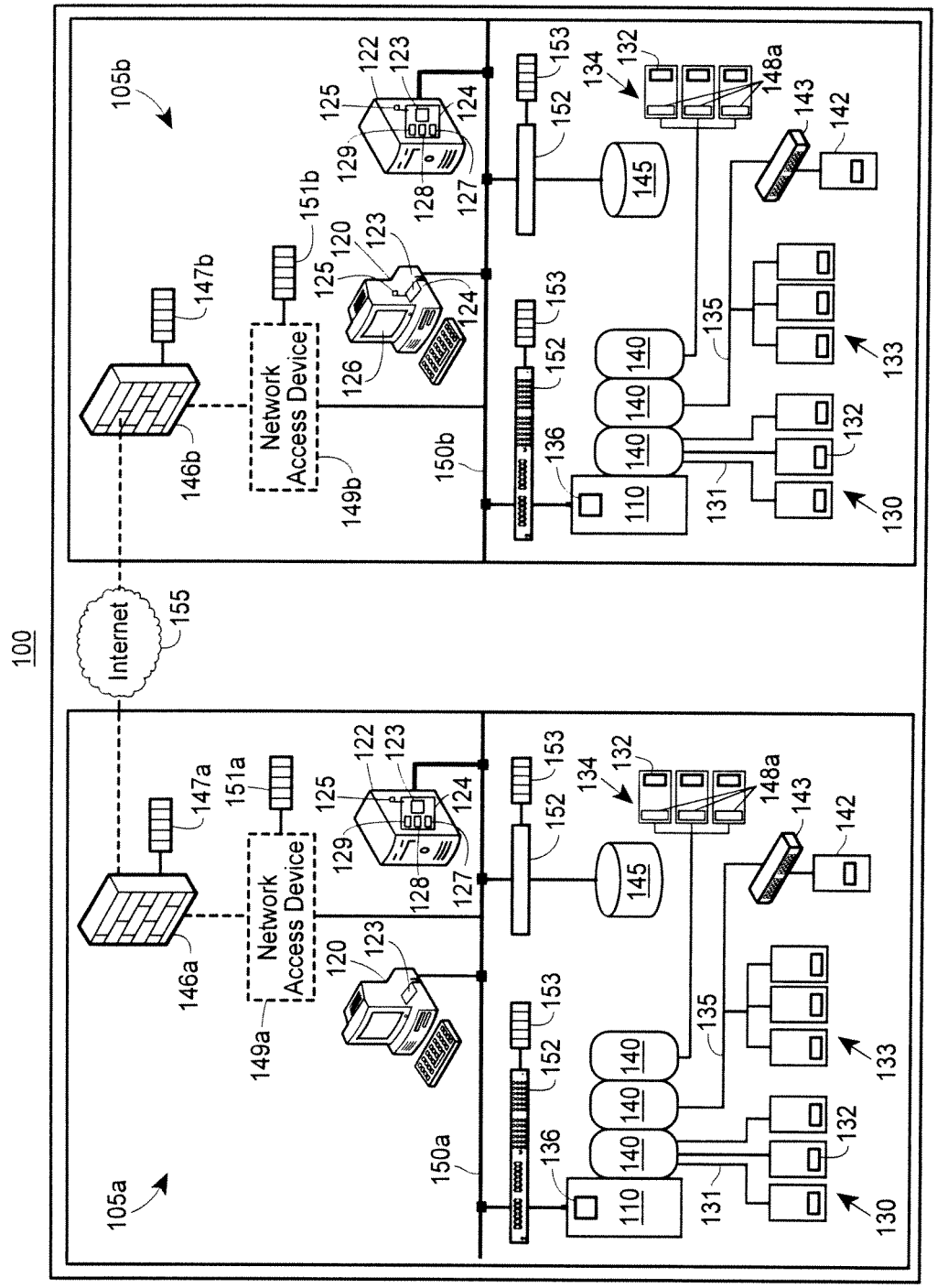
FIG. 1a is an exemplary block diagram of a process control system that includes elements that are distributed over the Internet, each element including one or more operator and maintenance workstations, controllers, field devices, network devices configured to implement the process control system network security functions (Unified Threat Management System; UTMS) as herein described, regular network devices, and supporting equipment that send and receive external data related to the process control system.
Figure 1B:
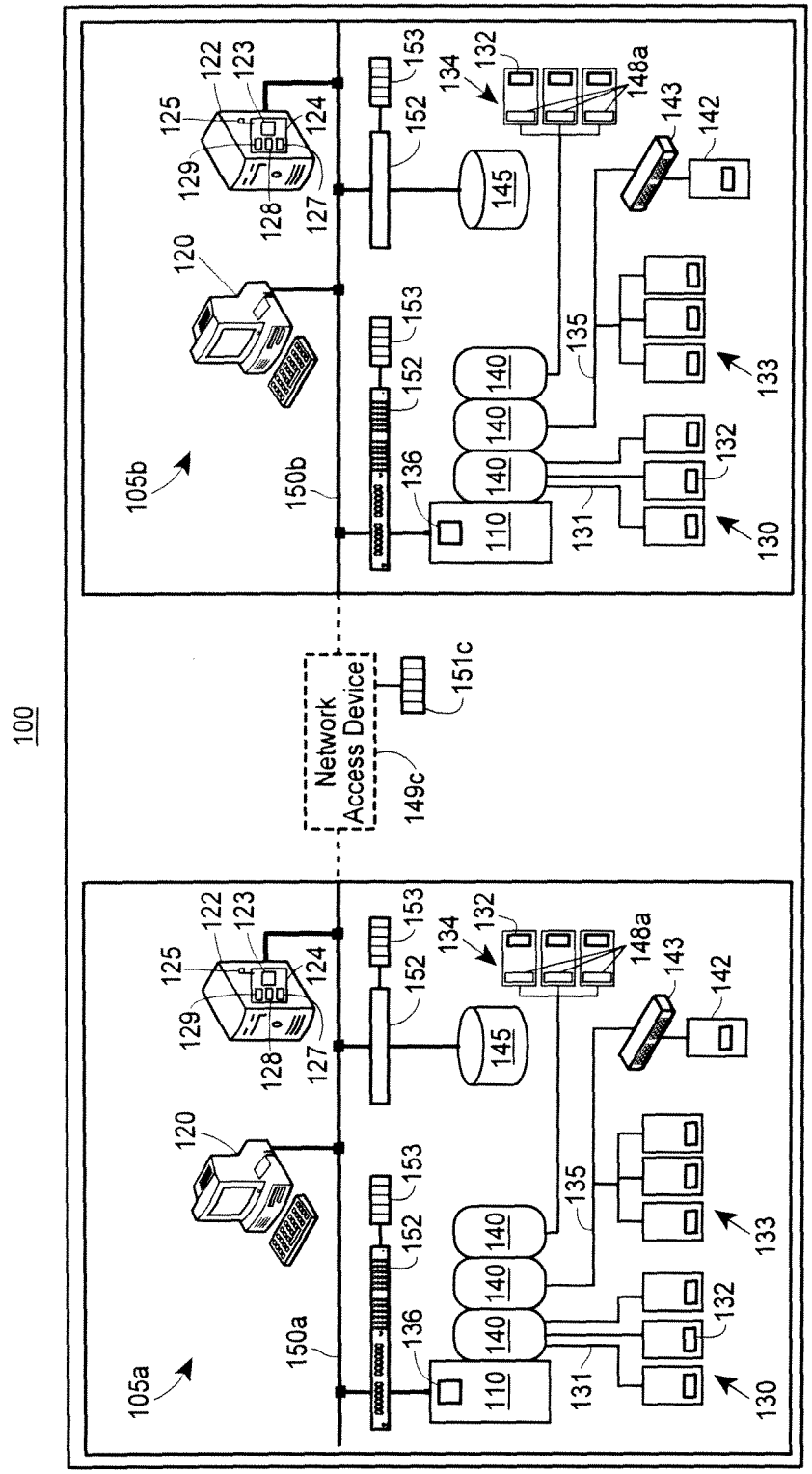
FIG. 1b is another exemplary block diagram of a process control system that includes elements that are distributed over the Internet, each element including one or more operator and maintenance workstations, controllers, field devices, a perimeter network device (firewall) and a network access device configured to implement the process control system network security functions (Unified Threat Management System; UTMS) as herein described, regular network devices, and supporting equipment that send and receive external data related to the process control system.

FIG. 1a is a schematic representation of a process control system 100 including one or more process control sub-systems 105a, 105b within one or more process plants in which external communication between, for example, each sub-system via the Internet or other external source may be secured by a "Unified Threat Management System" (UTMS) including one or more UTMS-configured network devices (e.g., firewalls) 146a, 146b, network devices 152, field devices, 134 smart devices, modules, controllers, components, etc., as herein described. FIG. 1b is a schematic representation of another embodiment of a process control system 100 including one or more process control sub-systems 105a, 105b that may be secured by a UTMS that, in addition to the devices 134, 146, 152 described below, includes a network access device 149 positioned downstream of the firewall 146. The network access device 149 of FIG. 1b may supplement the perimeter UTMS functions of the device 146, or may perform specialized UTMS functions such as the bypass function described below. Each firewall 146 or device 134, 149, 152 may include a ruleset, for example, rulesets 147a, 148a, 147b, 148b, 151a, 151b, 153 defining the communication that may be received or processed by the UTMS-configured device. Where the UTMS-configured device is a perimeter device (i.e., outside of the process control network 150a or 150b), the rulesets 147 and 151 may include a global set of rules for access to any device within the subsystems 105a, 105b. Where the UTMS-configured device is an internal device 134, 152 (i.e., within the process control network 150a or 150b), the rulesets 148, 153 may include a subset of the global set of rules that only defines access to the particular internal device. The rulesets 147, 148, 151, 153 may be policy or signature based, or any other type of ruleset that provides configurable guidance for UTMS-configured firewalls 146a, 146b, UTMS-configured network access devices 149a, 149b, and UTMS-configured field devices 134 (as described below) to protect the system from internal or external network threats. FIG. 1b is an alternative embodiment illustrating a cross-system connection between the sub-systems 105a and 105b including a UTMS-configured network access device 149c that may or may not include a ruleset such as ruleset 151c as herein described and may control different types of process control network connections as described below.

Generally, the UTMS may be a Network Intrusion Detection System (NIDS), a Host Intrusion Detection System (HIDS), a combination of these types of systems, or other known or future network security paradigms. For example, a NIDS-configured UTMS-configured firewall 146a, 146b and/or UTMS-configured network access device 149a, 149b, 149c or other UTMS-configured elements within the process control system 100 may use one or more rulesets to inspect and drop malicious packets from the network before the malicious packets can reach their intended destination within the process control systems and cause a fault. Additionally or alternatively, UTMS-configured firewalls 146a, 146b and/or UTMS-configured network access devices 149a, 149b, 149c or other UTMS-configured elements 134, 152 within the process control system 100, as further explained below, may be configured as a HIDS that monitors the process control system's state and detects if any internal or external communication violates the process control system's security policy. For example, a UTMS including HIDS components, rulesets, or configuration might use the current state of a process control system (i.e., device, module, or component information stored in RAM, in the file system, log files or elsewhere) and compare the current state against an expected state as described in one or more rulesets 147, 148, 151, 153 to ensure that the system is operating normally or as expected. Each UTMS-configured firewall 146a, 146b, network access device 149a, 149b, 149c, and UTMS-configured field device 134 may include one or more rulesets or other files that define the security policy for the system 100. As further described below, the perimeter devices may also algorithmically derive individual rulesets for each internal UTMS-configured device or various groups of devices and send a subset of the ruleset to the internal devices, or grant the internal device's access to the subsets.

Each component of the UTMS is integrated into the process control system's control environment, as further explained below, to enhance network security and facilitate network management and maintenance. The process control system 100 may include one or more sub-systems 105a, 105b one or more process control networks 150a, 150b and one or more process controllers 110 communicatively connected to one or more host workstations or computers 120-122 (which may be any type of personal computers, workstations, etc.), at least one having a display screen, via one or more network devices 146 over a process control network 150. While the process control system 100 of FIG. 1a shows only two process control sub-systems 105a and 105b communicating over the Internet 155 as a WAN, and the process control system 100 of FIG. 1b shows only two process control sub-systems 105a and 105b communicating over a LAN, a process control system 100 may include any number of sub-systems as well as devices, modules, and components that are communicatively connected to each other through any type of connection including Internet, LAN, wireless, twisted pair cable, optic fiber, etc., to name only a few.

Controllers 110 may include one or more network interface cards and are also connected to field devices 130 via input/output (I/O) cards 140. A data historian 145 may be any desired type of data collection unit having any desired type of memory and any desired or known software, hardware or firmware for storing data and may be separate from or a part of one of the workstations 120-122. The controller 110, which may be, by way of example, the DeltaV™ controller sold by Emerson Process Management, Inc., is communicatively connected to the host computers 120-122 by one or more network devices 146 via, for example, an Ethernet connection or any other desired communication network 150a, 150b. A network device 146 includes one or more of a network interface card, a network switch, a router, a firewall, a UTMS-configured firewall, a network access device, a UTMS-configured device, or any other component that facilitates data transmission over the network 150a, 150b without changing the underlying data communicated over any portion of a network, for example, the network 150a, 150b. The communication network 150a, 150b may be a local area network (LAN), a wide area network (WAN), a telecommunications network, etc. and may be implemented using hardwired or wireless technology, any portion of which may be implemented using an Internet connection. The controller 110 is communicatively connected to the field devices 130, 133, 134 using any desired hardware and software associated with, for example, standard 4 20 mA devices, standard protocols such as Ethernet, ARP, IP, ICMP, UDP, etc., and/or any smart communication protocol such as the FOUNDATION Fieldbus protocol (Fieldbus), the HART protocol, etc.

Figure 3:
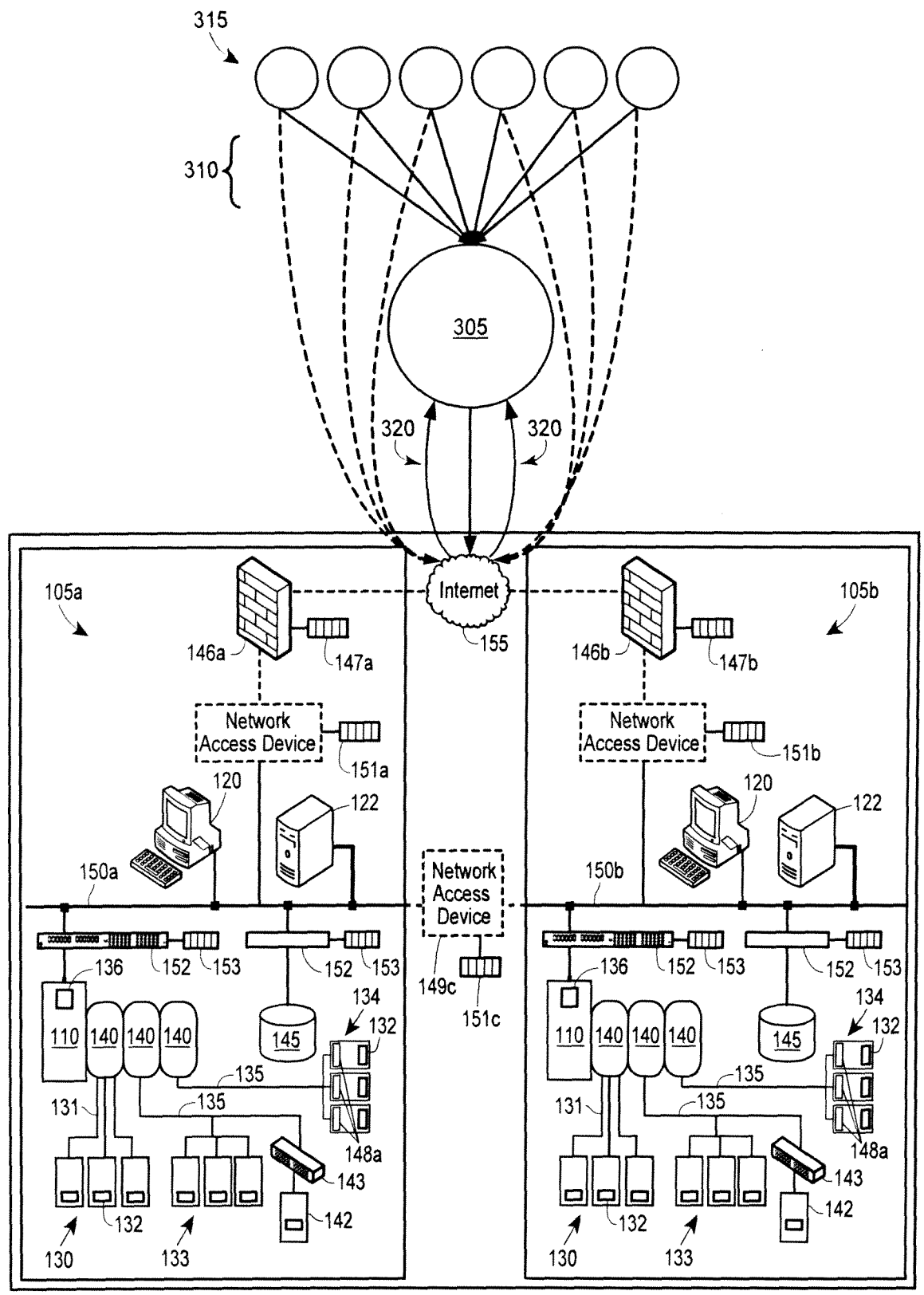
FIG. 3 is a logical block diagram of a method to update rulesets of the UTMS.

The field devices 130, 133, 134 may be any type of hardware component such as sensors, valves, transmitters, positioners, etc., while the I/O cards 140 may be any type of I/O devices conformning to any desired communication or controller protocol. In the embodiment illustrated in FIG. 1, the field devices 130, are HART devices that communicate over standard analog 4 20 mA lines 131 with a HART modem 140 while the field devices 133 are smart devices, such as Fieldbus field devices, that communicate over a digital bus 135 or I/O network 155 with an I/O card 140 using Fieldbus protocol communications, and the field devices 134 may be HART, Fieldbus, or other field devices that are UTMS-configured so that, in addition to performing a designated process functions described above, the devices 134 are configured to drop any data packets that match known vulnerabilities of the device itself (e.g., a particular sensor, valve, transmitter, positioner, etc., that is known to have a particular network communication vulnerability), that contain known threatening payloads, that originate from known threat locations, and that match a known pattern of malicious network activity. Of course, the field devices 130, 133, 134 may conform to any other desired standard(s) or protocols, including any standards or protocols developed in the future. The network 150 and devices may also be standard Ethernet communications and network devices supporting any communications protocol (e.g., TCP/IP, ModbusIP, etc.). The field devices 130, 133, 134 connected to the controllers 110 may store and execute modules, or sub modules, such as function blocks, associated with the control strategy implemented in the controllers 110. Function blocks 132, which are illustrated in FIGS. 1a, 1b, and 3 as being disposed in two different ones of the Fieldbus field devices 130, 134 may be executed in conjunction with the execution of the control modules 136 within the controllers 110 to implement process control, as is well known. As previously described, the field devices 130, 133, 134 may be any types of devices, such as sensors, valves, transmitters, positioners, etc. and the I/O devices 140 may be any types of I/O devices conforming to any desired communication or controller protocol such as HART, Fieldbus, Profibus, etc.

Additionally, a field device 142 may be connected to the digital bus 135 via a specialized network device 143, for example, a UTMS-configured network device, a gateway, router, a firewall, etc. For example, the field device 142 may only understand HART commands and the I/O network 135 may implement the PROFIBUS protocol. To this end, the gateway 143 may provide bidirectional PROFIBUS/HART translation as well as the UTMS-configured capabilities described herein. Alternatively or additionally, a network device may also be positioned at or near the gateway 143. Either or both of the gateway 143 and the device 142 may be UTMS-configured.

The controller 110, which may be one of many distributed controllers within the plant having one or more processors therein, implements or oversees one or more process control routines or modules 136. The routines may include one or more control loops that are stored in or associated with the controller. The controller 110 also communicates with the field devices 130, 133, 134, 142 the host computers 120-122, firewall(s) 146a, 146b and the data historian(s) 145 through the network 150 and other network devices to control a process in any desired manner. It should be noted that any control modules or routines 136 or elements described herein may have parts thereof implemented or executed by different controllers or other devices if so desired.

Likewise, the control routines 136, the management of UTMS-configured network devices, field devices, and other elements described herein to be implemented within the process control system 100 may take any form, including software, firmware, hardware, etc. For the purpose of this discussion, a process control element can be any part or portion of a process control system including, for example, a routine, a block or a module stored on any computer readable medium. Control routines, which may be modules or any part of a control procedure such as a subroutine, parts of a subroutine (such as lines of code), etc., and UTMS management routines may be implemented in any desired software format, such as using ladder logic, sequential function charts, function block diagrams, object oriented programming or any other software programming language or design paradigm. Likewise, the control routines and UTMS management routines may be hard coded into, for example, one or more EPROMs, EEPROMs, application specific integrated circuits (ASICs), or any other hardware or firmware elements. Still further, the control routines and UTMS management routines may be designed using any design tools, including graphical design tools or any other type of software/hardware/firmware programming or design tools. Thus, the controller 110 may be configured to implement a control strategy or control routine in any desired manner and may integrate UTMS management routines as herein described.

The firewalls 146 within the UTMS and any UTMS-configured network access devices 149, and field devices 134 may also be described as "smart" UTMS devices because they may be configured to perform many network security functions without direct intervention by system operators or other personnel. The UTMS-configured network access devices may also interface with the process control system 100 as a process variable that is able to be completely monitored and configured from a graphic display of an operator workstation, without IT personnel intervention, as described below. The UTMS-configured firewalls 146, network access devices 149, UTMS field devices 134, network devices 152, and associated rulesets 147, 148, 151, 153, are configured to protect the process control system 100 from internal and external network threats such as viruses, worms, or any other attack that may induce a fault in one or more network devices, field devices, or other portions of the process control system. The UTMS devices may be deployed at different levels within the hierarchy of the control system 100 for protecting systems when connected to other systems and for connections to dissimilar systems.

Each workstation 120, 122 includes a suite of operator interface applications and other data structures 123 which can be accessed by any authorized user (sometimes referred to herein as a configuration engineer and sometimes as an operator, although other types of users may exist as described herein below in connection with display layers customized for user type) to view and provide functionality with respect to devices, units, etc. connected within the process control system 100. The suite of operator interface applications 123 is stored in a memory 124 of the workstation 120, 122 and each of the applications or entities within the suite of applications 123 is adapted to be executed on a processor 125 associated with the workstation 120, 122. While the entire suite of applications 123 is illustrated as being stored in the workstation 120, 122, some of these applications or other entities could be stored in and executed in other workstations or computer devices within or associated with the system 100. Furthermore, the suite of applications can provide display outputs to a display screen 126 associated with the workstation 120 or any other desired display screen or display device, including hand-held devices, laptops, other workstations, printers, etc. Likewise, the applications within the suite of applications 123 may be broken up and executed on two or more computers or machines and may be configured to operate in conjunction with one another.

Generally speaking, the suite of applications 123 provides for or enables the creation and use of graphic displays for several different types of entities, the operation of which may be integrated together to provide for enhanced control, simulation, network security, and display functions within the process control system 100. The suite of applications 123 may be used to create and implement process graphic displays 127 (which generally provide an operator display pertaining to a portion of the process plant), process modules 128 (which generally provide a simulation of a portion of a process plant) and process control modules, such as the control routines 136, which generally provide or perform on-line control of the process. The process control modules 128 are generally well known in the art and may include any type of control module, such as function block control modules, etc. The process graphic display elements 127, which will be described in more detail below, are generally elements that displayed within operator, engineer or other displays to provide information to a user, such as an operator, about the operation, configuration, network security, or set-up of the process plant and the elements therein. The process modules 128 are generally closely tied to the process graphic display elements 127 and may be used to perform simulations of the operation of the process plant or of some of the different elements therein connected in the manner depicted in the process graphic displays 129. The process graphic displays 129 and process modules 128 are illustrated as being stored in and executed by the workstations 120 and 122, although the process graphic displays 129 and the process modules 128 could be downloaded to and executed in any other computer associated with the process control system 100, including laptops, handheld devices, etc.

Figure 2:
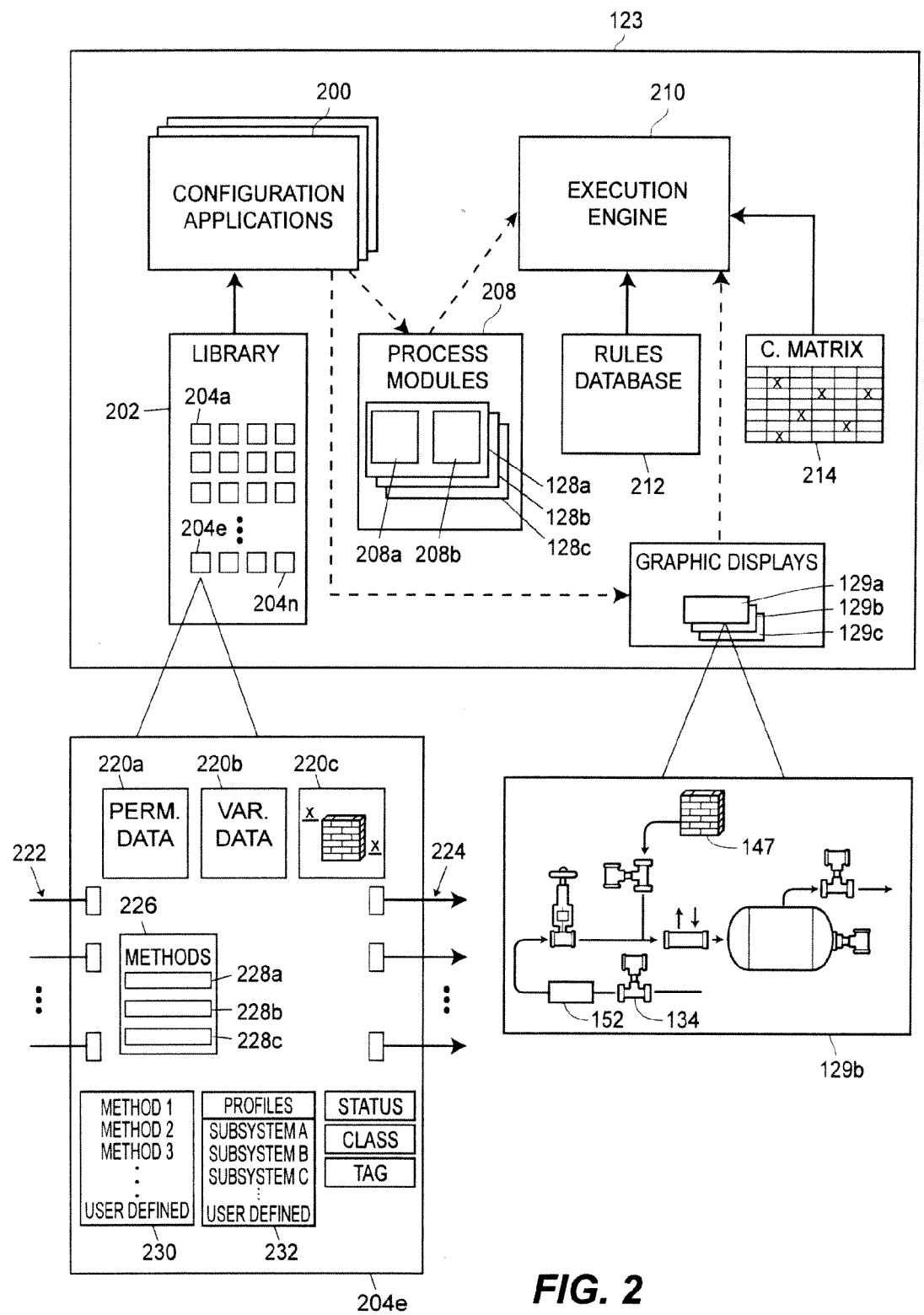
FIG. 2 is a logical block diagram of a set of applications and other entities, including UTMS-configured process objects and process modules, stored in the operator workstation of FIG. 1a and 1b, which may be used to implement the UTMS methods and techniques.

FIG. 2 illustrates some of the applications and data structures or other entities within the suite of applications 123 of the workstations 120, 122 (FIG. 1). In particular, the suite of applications 123 includes control module, process module, and graphic display configuration applications 200 which are used by a configuration engineer to create control modules, process modules (also called process flow modules), and the associated graphic displays. For example, a configuration engineer may create a control module for a UTMS-configured firewall 146, network access device 149, network device 152, or field device 134 for integration into a graphic display. While the control module configuration application 200 may be any standard or known control module configuration application, the process module and graphic display configuration application(s) may create process modules and graphic displays using one or more smart process objects, the nature of which is described in U.S. patent application Ser. No. 10/574,824. Still further, while the process module and process graphic configuration applications 200 are shown separately, one configuration application could create both of these types of elements.

A library 202 of process objects 204 includes example or template process objects 204 that may be accessed, copied and used by the configuration application 200 to create process modules 128 (FIG. 1*a*) and graphic displays 129. As will be understood, the configuration application 200 may be used to create one or more process modules 128 each of which is made up of or created from one or more process objects 204 and may include one or more process flow or simulation algorithms 206, which are stored in a process module memory 208. Additionally, the configuration application 200 may be used to create one or more graphic displays 129, each of which is made up of or created from one or more process objects 204 and may include any number of display elements connected together. One of the graphic displays 129*b* is illustrated in FIG. 2 in expanded form and includes a depiction of a set of process elements, such as valves, tanks, sensors, UTMS-configured devices, and flow transmitters, interconnected by connection elements which may be pipes, conduit, power cables, conveyors, etc.

An execution engine 210 operates or implements each of the graphic displays 129 and the process modules 128 during runtime to create one or more process displays for an operator as defined by the graphic displays 129 and to implement simulation functionality associated with the process modules 128. The execution engine 210 may use a rules database 212 defining the logic to be implemented on the process modules 128 as a whole and the process objects within those modules in particular. The execution engine 210 may also use a connection matrix 214 which defines the connections between the process elements within the system 100 as well as within the process modules 128 to implement the functionality for the process modules 128.

FIG. 2 illustrates one of the process objects in more detail, for example, a UTMS-configured process object 204*e*. While the UTMS-configured process object 204*e* may be an object within an object oriented programming environment and thus include data stores, inputs and outputs and methods associated therewith, this process object may be created by and implemented within any other desired programming paradigm or protocol. As will be understood, the UTMS-configured process object 204*e*, before being instantiated, is an object that is associated with a UTMS-configured device 134, 146, 149, 152 within the process control system 100 of FIG. 1. However, after being copied and instantiated, the UTMS-configured process object 204*e* may be tied to a particular UTMS-configured device within the process control system. The UTMS-configured process object 204*e* may be tied to the particular UTMS-configured device by a programmable interface to the particular device. A user may access the programmable interface though a graphic representation of the device within a graphic display that is displayed on the user's workstation. Once accessed, the user may display and configure various characteristics of the device. Further, the programmable interface may communicate various parameters about the UTMS-configured device to a user's graphic display.

In any event, the UTMS-configured process object 204*e* includes a data store 220 that is used to store data received from or pertaining to the UTMS-configured entity with which the UTMS-configured process object 204*e* is associated. The data store 220 generally includes a data store 220*a* that stores general or permanent information about the UTMS-configured entity to which the UTMS-configured process object 204*e* pertains, like manufacturer, revision, name, type, etc. A data store 220*b* may store variable or changing data, such as state data, parameter data, status data, input and output data, ruleset data, cost or other data about the UTMS-configured entity to which the UTMS-configured process object 204*e* pertains including data associated with the entity as it has existed in the past or as it now exists within the process control system 100. The UTMS-configured device or entity may receive the ruleset data and the UTMS-configured process object 204*e* may be configured or programmed to access the ruleset data 147, 148, 151, 153, (FIG. 1*a*) and other update data on a periodic or non-periodic basis via any desired communication link to the device or to a third party source (such as cyber security risk management firm 305 as described in relation to FIG. 3, below) via the network k150 or an Internet connection, via another UTMS-configured device that distributes ruleset data to the other UTMS-configured process objects within the process control system 100, or in any other desired manner. A data store 220*c* may store a graphical representation of the UTMS-configured entity 134, 146, 149, 152 to which the UTMS-configured process object 204*e* pertains and which is used for actual display to the operator via an operator interface, such as the screen 126 associated with the workstation 120 of FIG. 1*a*. The graphical representation may include place holders (marked by underlines within the data store 220*c*) for information about the entity 134, 146, 149, 152 such as information defined by the parameter or other variable data about the entity 134, 146, 149, 152 as stored in the data store 220*b*. This parameter data may be displayed in the graphical place holders when the graphical representation is presented to the operator on a display device 128 as part of one of the graphic displays 129. The graphical representation (and the UTMS-configured process object 204*e*) may also include predefined connection points (marked by an "X" in the data store 220*c*) that enable an operator or configuration engineer to attach upstream or downstream components to the process elements, as depicted by the graphical representation. Of course, these connection points also enable the UTMS-configured process object 220*e* to be aware of the process control system elements connected to that UTMS-configured object as configured within a process module and may specify a type of connection element that must be used, such as a pipe, a duct, a stream associated with that element, a data connection, etc.

The UTMS-configured process object 204*e* may also include one or more inputs 222 and outputs 224 to enable communication with other UTMS-configured process objects or non-UTMS-configured process object within or outside of a process module in which the UTMS-configured process object 204*e* is used. The connections of the inputs 222 and outputs 224 to other process objects may be configured by a configuration engineer during configuration of a process module by simply connecting other process objects (UTMS-configured or otherwise) to these inputs and outputs or by specifying particular communications that are to take place between process objects. Some of these inputs and outputs may be defined as being connected to the process objects connected at the predefined connection points for the UTMS-configured process object as discussed above. These inputs 222 and outputs 224 may also be determined or defined by a set of configuration rules (as opposed to the rulesets 147, 148, 151, 153, which define conditions under which network communication may or may not take place) within the rule database 212 and the connection matrix 214 defining the connections between different devices or entities within the process control system 100. The inputs 222 and the outputs 224, which include data stores or buffers associated therewith will, generally speaking, be used to provide communications of data from other process objects to the UTMS-configured process object 204e or to provide communications of data stored within or generated by the UTMS-configured process object 204e to other process objects. These inputs and outputs may also be used to provide communications between the process object 204e and other objects within the process control system 100, such as control modules within the controllers 110, field devices 130, 133, 134, etc.

As illustrated in FIG. 2, the process object 204e also includes a method storage 226 that is used to store zero, one or more methods 228 (illustrated as methods 228a, 228b and 228c in FIG. 2) which may include algorithms or modules to be implemented by the UTMS-configured process object 204e during execution of a process module in which the UTMS-configured process object 204e is used (e.g., a security module, a bypass module, etc., to perform the various UTMS and bypass functions as herein described). Generally, the methods 228 stored in the method storage 226 will use the data stored within the data storage portions 220a and 220b, data obtained from other UTMS-configured process objects, other process objects, or data from other sources, such as the configuration database, historian 145 (FIGS. 1a and 1b), and rulesets 147, 148, 151, 153, via the inputs 222 and the outputs 224 to implement the rules for network security, determine information about the network 150, the network security status, and configuration of the process control system 100 or an entity within the system. For example, the methods 228 may determine the number and type of network connections associated with the entity defined by the UTMS-configured process object 204e, errors associated with that or other network devices within the process control system 100, potential or actual network security faults within the system 100 as compared to one or more of the rulesets 147, 148, 151, 153, etc. The methods 228 may be preconfigured or modified during configuration of the process control system and will generally be executed each time the UTMS-configured process object 204e is executed within the execution engine 210 during runtime.

Some example methods 228 that may be provided within a UTMS-configured process object 204e, include, but are not limited to: 1) processing an alarm at a time before or when one or more of the rulesets 147, 148, 151, 153, expires (and configuring the time before expiration that would trigger the alarm); 2) processing an alarm when a rule of the rulesets 147, 148, 151, 153, is violated by network traffic received at the corresponding UTMS-configured device or network traffic sent from the device; 3) tracking vital statistics about network traffic including content, source, destination, timeout, etc.; 4) processing any alarm that indicates a ruleset violation or other abnormal conditions related to network traffic generally and the UTMS-configured process object 204e particularly; 5) determining a status of one or more of the UTMS-configured network devices 146, 149 including a number and type of internal and external data connections to the network 150; 6) monitoring and detecting connections external to the plant itself, connections within the plant; and any connection to the process control system, generally (e.g., the Delta-V™ system); and 7) determining or selecting a security profile (as described below) for selected sub-systems, particular devices, or areas within the process control system 100. These methods may allow an operator to access detailed network and threat statistics as well as information about the network 150 as it relates to the process control system 100 generally.

The methods 228 may also supplement simulations of the operation of the UTMS-configured network device 134, 146, 149, 152 associated with the UTMS-configured process object 204e including the network traffic flowing through any of the process control system's 100 process entities. Thus, the methods 228 may be provided to calculate network related statistics related to mass balances, energy balances, flows, temperatures, compositions, vapor states, and other system-level or stream level parameters associated with the material in the process control system 100, to simulate network traffic to the element so as to calculate expected network traffic output based on provided inputs, etc. Of course, these are but a few of the methods that can be stored in and run by a UTMS-configured process object 204e, and there are many other methods that may be used, with such methods generally being determined by the type of UTMS-configured network device 134, 146, 149, 152 or process control entity being represented, the manner in which that device or entity is connected in and used in a process plant as well as other factors. It is important to note that, while the UTMS-configured process object 204e may store and execute methods that detect system-level network conditions, errors, etc., these methods may also be used to determine other information about devices, logical elements (e.g., process control modules and loops), and other non-system-level entities. If desired, the methods 228 may be programmed or provided in any desired programming language, such as C, C++, C#, etc. or may be referenced to or may define applicable rules within the rule database 212 or the rulesets 147, 148, 151, 153 that should be run for the process object 204e during execution.

If desired, each UTMS-configured process object may include a library of applicable algorithms or methods which may be used to define the behavior of the UTMS-configured process object when connected within a process module. Such a library is illustrated in a pull down menu 230 for the UTMS-configured process object 204e of FIG. 2 and a similar menu may be associated with each other UTMS-configured process object. The configuration engineer may define the behavior of a UTMS-configured process object when this object is placed in a process module 208 by selecting one of the library of algorithms (called method 1, method 2, etc.) via, for example, the pull down menu 230. In this manner, the configuration engineer may define different behaviors (whether during simulation or runtime) for a process object depending on the type or nature of the process for which the process object is being used to model.

UTMS-specific functions may also be integrated into the pull-down menu 230 in addition to the algorithms or methods which may be used to define the simulation behavior of the UTMS-configured process object when connected within a process module. For example, the pull down menu 230 may also permit the user to select one or more sub-systems (for example, sub-systems 105a, 105b) or different portions of the system 100 to protect for the particular UTMS-configured device represented by the UTMS-configured process object 204e. Additionally, the menu 230 may permit a user to specify which types of communications networks are allowed to access to the UTMS-configured device (e.g., Modbus TCP, EtherNet IP, ProfiNet, OPC, etc.). The drop down menu or other menu or user-selectable item may also permit the user or operator to identify a ruleset version, a time since last update of the ruleset 147, 148, 151, 153, or until the next update, a device state, information about other UTMS-configured devices within the system 100, network statistics, etc.

If desired, the configuration engineer may also provide a proprietary or other user supplied algorithm to define the simulation behavior of the UTMS-configured network device 134, 146, 149, 152 defined by the process block. Such a user defined algorithm (illustrated as the "user defined" entry in the pull down menu 230) may be provided to and stored in a UTMS-configured process object 204e when that object is placed within or used within a process module 208. This functionality enables the simulation behavior to be customized by the user to thereby provide for better or more accurate simulation of the potential for network threats and the security of the process control network 150 during selected points along a particular process or step in the process. If desired (and as described in more detail below), a UTMS-configured process object 204 or each process module 208 may include an operator actuatable switch (such as an electronic switch or a flag) that disables the use of the simulation algorithms within the UTMS-configured process object and that, instead, causes the behavior of the process module to be determined by a high fidelity simulation package or program, such as one provided by HYSYS. In this case, the UTMS-configured process object 204e or the process module obtains simulated parameter data from the high fidelity simulation, as opposed to using the simulation algorithms within the UTMS-configured process objects themselves.

During execution of a graphic display 129 or a process module 208 by the execution engine 210, the engine 210 implements the communications defined by the inputs 222 and outputs 224 to each of the UTMS-configured process objects in the graphic display 129 or process module 208 and may implement the methods 228 for each of those objects to perform the functionality provided by the methods 228. As noted above, the functionality of the methods 228 may be located in programming within the UTMS-configured process object or defined by a set of rules within the rule database 212 that the engine 210 executes, or on one or more rules of the rulesets 147, 148, 151, 153, based on the type, class, identification, tag name, etc. of a UTMS-configured process object 204e, to implement the functionality defined by those rules.

It will be noted that an instance of the UTMS-configured process object 204e that is associated with a UTMS-configured process module has a tag or unique name within the context of the UTMS-configured process module with which the UTMS-configured process object 204e is associated. This tag or unique name may be used to provide communications to and from the process object 204e and may be referenced by the execution engine 210 during runtime. Process module tags should be unique within the control system configuration. This tagging convention enables elements within the process modules 208 to be referenced by elements within others of the process graphic displays 129, process modules 128 and even the control modules 136. Still further, the parameters of the UTMS-configured process object 204e can be simple parameters, such as simple values, structured parameters or smart parameters that know the expected units and attributes associated therewith. Smart parameters can be interpreted and used by the process rules engine or execution engine 210 to assure all signals are being sent in the same units or are converted properly. Rules can also be used to turn on and turn off groups of alarms for the UTMS-configured smart process objects (or process modules) to create a smart alarm strategy and/or interface for the operator. Still further, UTMS-configured process object classes can be associated with equipment and module classes within the process control strategy of the plant and process control system 100 to provide a known linkage between a UTMS-configured process object and the process variables it will need to interpret or access.

UTMS-configured process objects, when used in process control graphic displays or process modules, may also include mode of operation, status, and alarm behavior so that these UTMS-configured objects may be put in different modes during runtime, such as the off, start-up, and normal modes, and may provide a status associated with the object based on its current operating state. Additionally, the UTMS-configured process objects may access one or more rulesets 147, 148, 151, 153, and compare detected current network conditions to one or more rules within the rulesets 147, 148, 151, 153, to provide alarms based on detected network conditions (e.g., an unexpected increase in network traffic or type of traffic at the UTMS-configured object), to detect a software update of another element in communication with the UTMS-configured object that would require an update of the rulesets 147, 148, 151, 153, to fully secure the system 100, to detect a known fault-inducing attack on the network and expiration of a ruleset 147, 148, 151, 153, etc. UTMS-configured process objects may also have a class/subclass hierarchy which enables them to be categorized in class libraries, to be collected together in a composite structure, etc. Still further, UTMS-configured process objects may utilize information from other elements, such as control modules and other objects to enable the UTMS-configured process object to recognize when its associated entity is busy or, for example, acquired by a batch control process within the process control system 100.

UTMS-configured process objects may also be associated with any desired process entity, such as physical devices like pumps, tanks, valves, etc., logical entities such as process areas, measurements or actuators, control strategies, etc., and network devices such as network interface cards, network switches, routers, firewalls, controllers, operator workstations, etc. In some cases, UTMS-configured process objects may be associated with network connectors, such as communication wiring and wireless data links, or any other device or entity that moves network traffic from one point to another point within the process. UTMS-configured process objects that are associated with connectors, sometimes referred to herein as UTMS-configured links or connector elements, are also tagged.

In the context of a UTMS-configured process object, UTMS-configured links will typically include properties or parameters that define network traffic flows through the various network connections within the process control system 100. These parameters may indicate the type and nature of network traffic flow through the link. The UTMS-configured link may also include methods that model the network traffic flow through the link using a model or an algorithm to estimate the traffic. The stored parameters for the UTMS-configured process object may also be used in these methods. Thus, in essence, the links or connector elements enable UTMS-configured process objects to be aware of the other upstream and downstream objects or entities. In one embodiment, the matrix 214 may be created prior to execution of process flow modules and may define for the links the interconnections between the different devices within the plant and, therefore, the interconnections between the different UTMS-configured and non-UTMS-configured process objects. In fact, the execution engine 210 may use the matrix 214 to ascertain the upstream and downstream entities and thereby define the communications between the UTMS-configured process objects and the methods associated with the UTMS-configured process objects. Still further, one or more sets of rules may be provided to be used by the UTMS-configured process objects to interact with each other and to obtain data from each other as needed for the methods within the UTMS-configured process objects and to resolve the impact of UTMS-configured and non-UTMS-configured objects associated with output connections.

If desired, the UTMS-configured process object 204e may also include hot links, such as URLs, to key documentation which may be applicable to the type of object, or which may be specific to the instance (depending on the criticality and application) of the device to which the UTMS-configured process object 204e pertains. The documentation may be vendor supplied as well as user-specific. Some examples of documentation include configuration, start-up and shut-down procedures, operational and maintenance documentation. If desired, an operator may click on the object as displayed in an operator display to bring up the instance specific (if any) and generic documentation for the object or associated device. Also, the operator may be able to add/delete/change documentation independently of the system software such as maintenance requests, records of operational problems, etc. Furthermore, these hot links may be user configurable or changeable to provide the ability to add knowledge links to objects in an operator interface, to provide for quick navigation to appropriate information associated with the object and to provide the ability to add work instructions specific to the customer, to the specific object type or even to the specific instance of the object.

While the process modules and process graphics are described above as being created together by the interconnection of different UTMS-configured process objects, they may be created separately. For example, a process graphic may be created using UTMS-configured process objects and, when completed, a process module for that graphic may be generated based on graphic elements and their interconnections in the graphic display. Alternatively, the process module may be first created using UTMS-configured process objects and, once created, a graphic display for that process module may be automatically generated by the configuration application 38 using the graphic display elements in the UTMS-configured process objects used to create the process module. Still further, a process module and a graphic display may be created separately and the individual elements within these two entities may be tied together manually by referencing one another (e.g., using the tag properties of the elements within the graphic display and the process module). Through this mechanism, a UTMS-configured process object may be referenced by multiple displays. In any event, once created, a process graphic display and an associated process module may be run independently or separately, although they will typically communicate parameters and information back and forth as desired or needed.

The configuration of the UTMS-configured devices and the rulesets 147, 148, 151, 153 may be based on specifying the specific sub-systems to be connected within the larger process control system 100 from the pull-down menu 230 as described above or other similar selection interface, such as pull down menu 232. Such ease of configuration may eliminate the need to provide a detailed packet filter configuration within the rules of the one or more rulesets 147, 148, 151, 153. For example, in a graphic display including one or more UTMS-configured devices, the configuration of the UTMS devices may be accomplished by simply selecting the sub-system to protect from the drop-down menu 232 rather than defining ports and TCP or UDP protocols for perimeter firewalls to block/allow. Together with the ability to select what communications networks to allow (as described above), a user may easily configure each UTMS-configured device while reducing the risk of mis-configuration and reduced security. Additionally, a user may define an area of the process control system 100 to protect using the UTMS-configured process object 204e. In one embodiment, the user may select one or more process control devices and entities from a graphical display to define which areas or subsystems are protected and monitored by the particular UTMS-configured network device 146, 149, 152. Additional security options may also be configured for the UTMS-configured network device 146, 149. 152 from the UTMS-configured process objects 204e including the type of monitoring or protection that may be available for the selected sub-system, entity, or areas of the process-control system, which rules are available for the user-defined area, detected conditions that may trigger one or more alarms, etc. Of course, other types of user interfaces other than the drop-down menus 230, 232 described above may assist a user in the configuration of each UTMS-configured process control object. The drop-down menus 230, 232 or other configuration interfaces for the UTMS-configured objects may be tightly integrated into the protected system 100, or available via a secure web page (or similar native page available within the UTMS-configured object 204e).

Access to the one or more user interfaces described above for configuration, update, accepting ruleset updates, etc., for UTMS-configured devices (or access through the device to the protected system via an associated UTMS-configured process control object) may be protected via an inbuild, two-factor authentication module that is an inherent part of the device (i.e., an authentication method stored as computer-executable instructions within a secure EEPROM or a secure IC within the UTMS-configured device, as one of the methods 228, etc.). Alternatively, the two-factor authentication method may be a configuration application 200, as described above. An authentication method may also be integrated into user authentication that is native to the system 100 for operator and other user access. For example, the UTMS-configured device and the process control system 100 may both utilize a common Remote Authentication Dial In User Service (RADIUS) authentication server. In some embodiments, the RADIUS server is built into the UTMS-configured device. In other embodiments, the authentication method may include tokens, smart cards, and other known two-factor methods.

Generally speaking, a set of predefined graphic elements may be provided in the configuration application to enable a user to construct process graphic displays that reflect the process plant and the process control system 100 in general and include visual representations of the UTMS-configured devices as described above. These displays have graphic display elements designed to dynamically show on-line measurements and actuators that interface with the control system and, as a result, may present information typically monitored and utilized by operators or other personnel involved in on-line operations. The graphic display elements that represent UTMS-configured elements may dynamically show on-line network security measurements. For example, the UTMS-configured elements within each graphic display may dynamically show a current operating state of the UTMS-configured element, alarms based on detected network conditions (e.g., an unexpected increase in network traffic or type of traffic at the UTMS-configured object, detection of a known fault-inducing attack on the network, etc.), detection of an update (e.g., software, firmware, existing configurations, etc.) of another element or device in the process control system 100 that is in communication with the UTMS-configured object, etc. Detection of certain network conditions may also trigger an automatic update of the rulesets 147, 148, 151, 153 or an alarm to prompt a user to perform a manual update of the rulesets or another action to fully secure the system 100.

In addition to on-line measurements and actuators that interface with the control system 100 and the network parameters of the UTMS-configured elements of the system 100, unmeasured parameters that reflect process operation and unmeasured parameters that reflect network health or security may be calculated using on-line process simulation provided in the UTMS-configured process modules and may be shown as an integral part of the associated graphic displays. In these and other ways, the process graphic displays may provide information typically monitored and utilized by plant personnel other than operators, such as engineering personnel, management, and process control network specialists.

Additionally, in an offline environment that may be used for engineering or training simulation purposes, the process simulation values provided by the UTMS-configured process modules may be used and/or displayed in place of the actual process and network measurement values otherwise provided by the graphic elements and the associated control modules. These simulation values, which may be calculated by the associated process modules or a third-party simulation application (e.g., HYSYS), may be based on actual plant settings (e.g., an actuator position or state, a network configuration or state, rulesets, etc.) as well as user-specified disturbance settings or values that may be established via, and depicted in, the process graphic displays and their respective graphic display elements. To these ends, a content layer of the process graphic display customized for an offline view of the process graphic displays may be generated and made available in, for instance, a training context.

More generally, the process graphic displays may be used in a variety of contexts involving both on-line or control situations, and off-line or simulation situations, by a number of different types of personnel. To this end, each process graphic display may have a plurality of content layers dedicated to these different contexts, situations and personnel. These dedicated content layers are integrated portions of the objects used to define them, in the sense that the same object or objects have associated therewith the information necessary to generate all of the different content layers. As a result, the content layers of a single process graphic display provide customized views without requiring a configuration engineer, IT network security specialist, or other design personnel to create a separate display for each of the views.

Generally speaking, the graphic displays reflect the process control system and the process plant. The graphic display elements within each display are designed to dynamically show on-line measurements and actuators that interface with the control system and, as a result, may present information typically monitored and utilized by operators or other personnel involved in on-line operations. In addition, unmeasured parameters that reflect process operation may be calculated using on-line process simulation provided in the process modules and may be shown as an integral part of the associated graphic displays. In these and other ways, the process graphic displays may provide information typically monitored and utilized by plant personnel other than operators, such as engineering personnel or management. Graphic elements within the displays that represent the UTMS-configured network devices 134, 146, 149, 152 provide network parameters and security data (as described above) to operators and other plant personnel to monitor and maintain the network security of the process control system 100.

As previously described, the various rulesets (e.g., rulesets 147, 148, 151, 153) associated with the UTMS configured network devices 146, 134, 149, 152 require updates to remain effective against network threats. With reference to FIG. 3, a third party, cyber security risk management firm 305 such as Wurldtech Security, Inc. of Vancouver, BC Canada, or other entity, may collect threat data 310 from a plurality of various sources 315 to construct the various rulesets 147, 148, 151, 153, validate the rulesets, verify, and distribute the rulesets to the UTMS-configured firewalls 146a, 146b, UTMS-configured network access devices 149c, other UTMS-configured network devices 146, and/or UTMS field devices 134. Ruleset collecting, constructing, validating, and distributing may be performed using any type of information technology methods suitable for performing such actions using electronic data. For example, some of the methods may include collecting the threat data 310 from the World Wide Web using various data collection techniques (e.g., robots, crawling, data feeds, collaborative forums, etc.), constructing data files to convey the rulesets to their destination devices in a device-compatible manner, executing a computer-implemented algorithm to determine if the rulesets effectively secure the process control systems in a desirable manner (e.g., simulation or other testing method), and distributing the rulesets to the UTMS-configured entities via a secure Internet interface or other suitable method.

In addition to collecting known threat data 310, the process control system 100 may send domain-specific information 320 back to the firm 305. For example, domain-specific information may include data that indicates information related to the topography of the system 100 (i.e., the manufacturer, model, state, software/hardware versions, etc., of the types of physical devices in the system 100 including pumps, tanks, valves, etc), protocol and other network 150 infrastructure information, software versions of each physical device, network device, and UTMS-configured device, etc. The firm 305 may then use various analysis techniques to build domain-specific robustness testing tools to continuously identify network vulnerabilities in any device, sub-system, or software program (to name only a few of the possibly identifiable vulnerabilities) using the domain-specific information sent from the process control system 100. The firm 305 may then aggregate the results of the analysis performed by the testing tools into a collection that identifies the specific system vulnerabilities. The collection may be categorized, sorted, and prioritized based on several factors including the security risk of the identified vulnerability, the danger a breach of network security due to the vulnerability might cause, the potential for repeated network breaches, etc. Each of these known vulnerabilities may then be translated into mitigations or rules for the various rulesets 147, 148, 151, 153, and the firm 305 may provide an ongoing remediation update service to the system 100 in the form of UTMS-device updates. In this way, each time a new device or code application is introduced to the system 100, any exposure to bugs or other vulnerabilities may be reduced or eliminated.

Each ruleset may be a data file that includes known signature, policy, or other rules describing characteristics of network-based threats to the process control system 100. The rulesets may be configured to control both internal and external access to the network 150 for each portion of the process control system 100. Because the UTMS-configured network device 134, 146, 149, 152 is configured as a process variable (as described above), the rulesets 148, 147, 151, 153 may be configurable by an operator or other personnel from a graphic display 129 at a workstation 120. For example, based on various characteristics of the process control system 100 (e.g., the number and type of UTMS-configured devices within the process control system 100, the importance or 'sensitivity' of network security to a particular sub-system, entity, or other portion of system 100 to be protected by the rulesets, the likelihood of external network attack, etc.), the user may individually configure and manage the network security of any portion of the process control system 100. In some embodiments, the user's graphic display may include a number of pre-configured "network security profiles" that employ a subset of the rules that are distributed to the system 100. Depending on the sensitivity of the process being performed by the process control system 100 or other factors, the user may select a profile that best balances the need for network security and the continuing operation of the system 100. Where the ruleset is received by a perimeter UTMS-configured network device, the device may determine which rules of the received ruleset are appropriate for which subsystems of the process control system. The perimeter device may then distribute the determined rules to the appropriate device within the subsystems. Those subsystems may, in turn, also determine smaller sets of rules and distribute those within the subsystem. Thus, a selected profile or policy may enforce a subset of the total number of rules within one or more rulesets 147, 148, 151, 153 according to the network security needs of the process control system. Alarms may also indicate to a user whether a particular selected profile is adequate for security according to static and dynamic conditions of the network including, but not limited to detected traffic, a state of the system 100, a length of time a profile has been active, etc. Timers associated with an alarm may also be set by default or configured by a user to limit an amount of time the selected profile is in place. Each timer may include a default setting depending on the rigidity of the selected profile and the sensitivity of the secured entities or devices. For example, a particularly sensitive process for which a user selects a relaxed security policy may only be in force for a short period of time before an alarm is indicated, while a particularly secure process for which a user selects a rigid security policy may be in force for a long short period of time.

Each of the rulesets 147, 148, 151, 153 may define conditions that, if detected, implement some combination of blocking suspected malicious communications or alerting an operator or other plant personnel through an alarm displayed within one or more graphical displays, as previously described. Additionally, each operator may have integrated control over ruleset updates directly from their respective operator displays. For operators with non-supervisory permissions, secondary or supervisory authentication may be enabled to implement a ruleset update (e.g., the two-factor authentication process described above).

In some embodiments, the UTMS-configured firewalls 146a, 146b, UTMS-configured network access devices 149c, other UTMS-configured network devices 146, and/or UTMS field devices 134 may also be configured to collect and aggregate threat data 310 directly from the firm 305 or plurality of sources 315 to construct, validate, and verify the various rulesets (as shown by the dotted communication lines to deliver the threat data 310 of FIG. 3). Further, the perimeter UTMS-configured devices 146, 149 (i.e., those UTMS entities that are positioned outside of the process control network 150) may receive a ruleset from the third party source 305 that includes rules for all of the various internal UTMS-configured devices within the process control system 100. The perimeter device(s) may then algorithmically derive individual rulesets for each internal UTMS-configured device or various groups of devices and send the smaller rulesets from the perimeter device(s) 146, 149a to the internal devices 134, 152 or arrange the derived rulesets into the network profiles, as described above. The sources 315 may create the threat data 310 by monitoring, defining, and analyzing potential and known threats to the security of the process control network(s) 150. For example, data from the Vulnerability Research Service (VRS) of Assurent Secure Technologies, the Computer Emergency Response Team (CERT) of Carnegie Mellon University, Secunia, end user research and monitoring, and data from Achilles™ certified product users (to name but a few of the sources for firewall ruleset data) may be aggregated.

Alternatively or in addition to the implementation of the various rulesets described above, network traffic that is external to the system 100 may need to be selectively activated and deactivated to ensure proper security during particularly sensitive processes (e.g., nuclear power plants, municipal services, public communications systems, etc.). For example, one or more network security profiles, as described above, may be implemented to provide a software method that selectively activates and deactivates communication between any of the process control system 100 entities. Further, and with reference to FIGS. 4-12, a network access device such as UTMS-configured network access device 149 (FIGS. 1a and 1b) may provide an operator a solution for bypass control to selectively turn off and turn on network connections to entities that are internal or external to the process control network to re-route network traffic around a disabled, malfunctioning, or rigidly-configured network device. With such a UTMS-configured network access device 149 and a user interface associated with a representation of the UTMS-configured network access device 149 to which a UTMS-configured process object 204e pertains to selectively turn off and turn on various network connections from a graphical display within the operator's workstation and bypass selected, restrictive devices.

Figure 4:
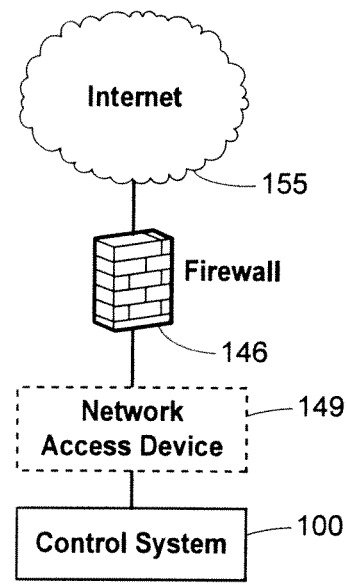
FIG. 4 is a simplified block diagram of a UTMS-configured network device for communications that are external to the process control system.
Figure 5:
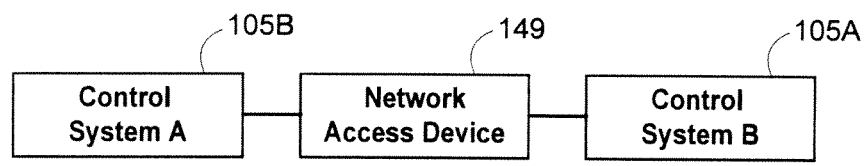
FIG. 5 is a simplified block diagram of a UTMS-configured network device for cross-system communication connections.
Figure 6:
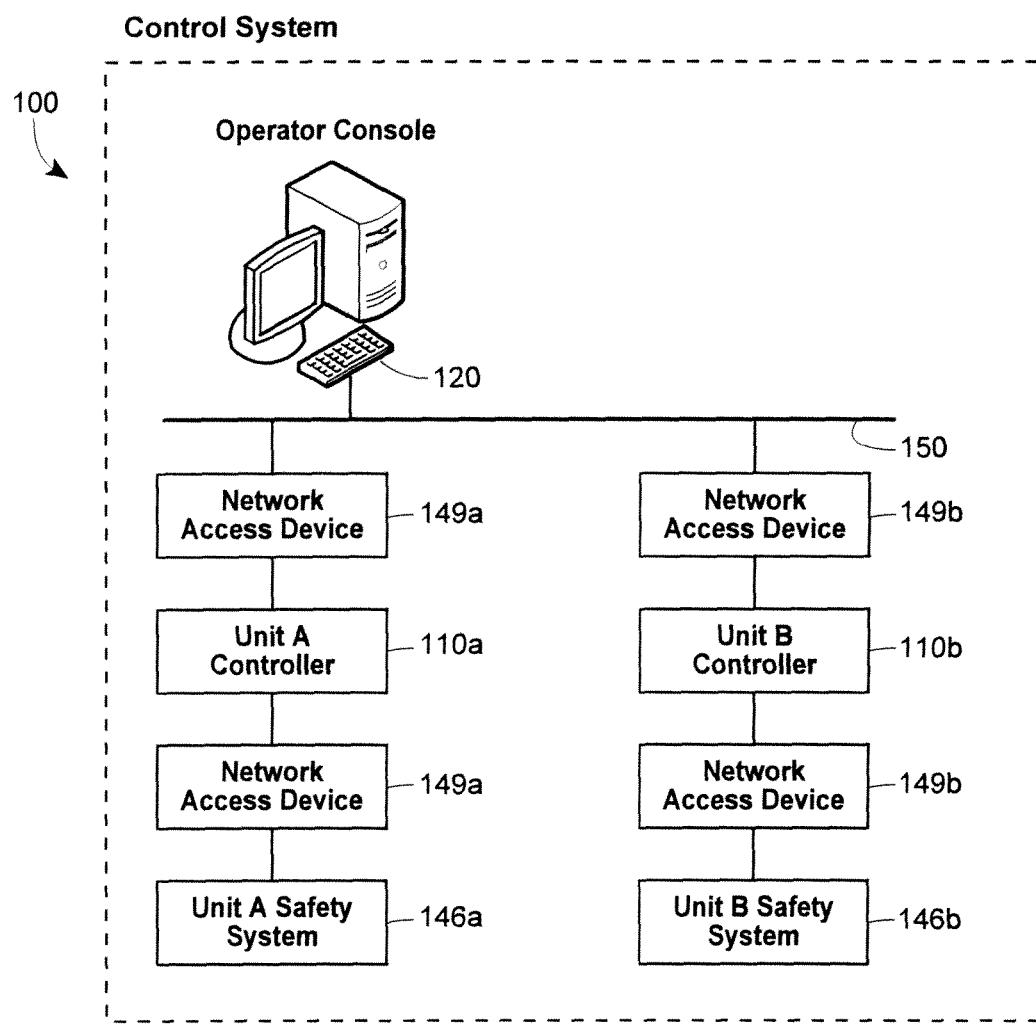
FIG. 6 is a simplified block diagram of a UTMS-configured network device for intra-system communication connections.
Figure 7:
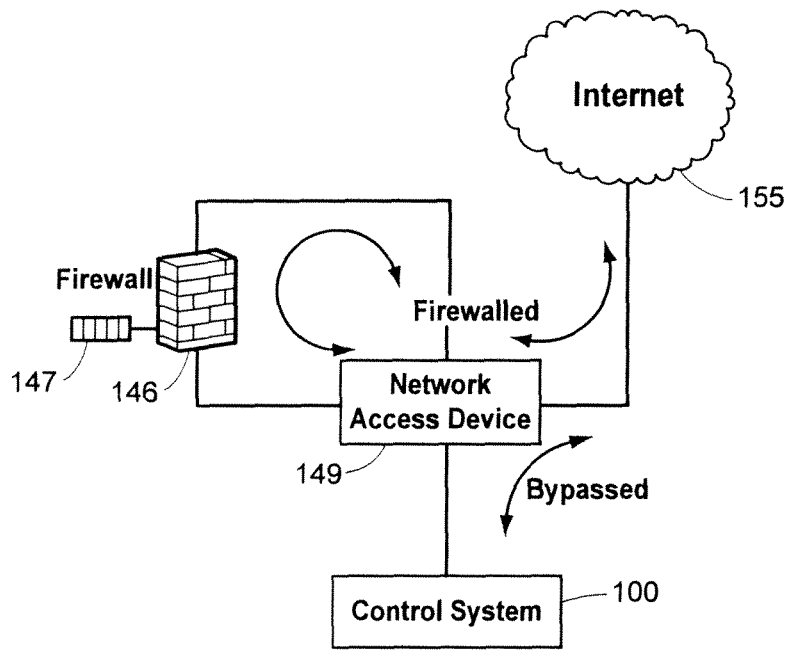
FIG. 7 is a simplified block diagram of an integrated UTMS-configured network device to bypass a firewall or other network device in a process control system.

As described above, the UTMS-configured network access device 149 is a native part of the control system 100 and a user may configure the device 149 using a graphic display of the process control system 100 that includes a representation of the device 149. As shown in FIG. 4, this device 149 may be used by the operator or other authenticated personnel to control network access between the site and the internet and, as shown in FIG. 5, between sites, or, as shown in FIG. 6, within sites (i.e., between areas or units of the plant). In addition, and as shown in FIG. 7, the UTMS-configured network access device 149 may be used to temporarily bypass firewalls 146 that are upstream of the device 149 to allow less secure access (i.e., technical support, maintenance, etc.) without having to modify the firewall rules 147 or change a previously selected network security profile. For example, within an integrated safety system for a process control system, such as DeltaV™ SIS, the UTMS-configured network access device 149 can also be used to disconnect the safety system from the control system 100 (as in FIG. 6).

A UTMS-configured network access device 149 configured to bypass selected other devices within the process control system 100 may be a native part of the control system 100, and the state of the UTMS-configured network access device 149 and other connected devices may be integrated into the process control system (i.e., the state of the UTMS-configured network access device becomes a process variable). As such, the device's state may be viewable from an operational display, historized in the control system's history collection 145, and used within process alarms. Using the state and other parameters of the UTMS-configured network access device 149 with alarms allows greater monitoring capability over the network 150 as an alarm may be generated if the network connection is left on or a profile in left in force for longer than a configured period of time. The UTMS-configured network access device 149 may also be configured to automatically terminate the connection or other parameter as a configured time period is reached for an open connection, profile, or other parameter. Thus, the operator may be alerted before the connection is terminated to give the operator a chance to reset the time period, selected a different profile, or other parameter. Additionally, a failsafe configuration may deactivate external connections during a loss of communication with the process control system or other conditions.

There may be several different types of network connections with which the UTMS-configured network access device 149 may be used within the process control system 100. For example, temporary connections, normally active connections, and bypass connections may be used with the UTMS-configured network access device 149, however, other types of connections within the process control system 100 may be so configured. Temporary connections include, but are not limited to, connections between the site or system and the internet (e.g., for customer support), connections between the site or system and a corporate headquarters (e.g., for backup, history archiving, etc.), and connections between multiple sites that are required during data or product transfer between the sites or various systems. Normally active connections include, but are not limited to, control strategies that span multiple systems (e.g., sub-systems 105a and 105b) or between individual elements, units, or devices within the control system 100 (e.g., connections between a process control system 100 and a related safety system).

In a bypass connection, the UTMS-configured network access device 149 may be used to temporarily bypass a firewall 146 or other network device in order to continue communications through the firewall 146. A bypass connection may be needed when there is a failure of a network device or the firewall rules 147 or a selected ruleset profile is configured to be too restrictive for known, safe communications. While commercially available bypass devices may monitor the health of the link or the network device being bypassed in order to make the decision to perform the bypass, the UTMS-configured network access device 149 may perform functions other than monitoring. Particularly, because the UTMS-configured network access device 149 is integrated into the process control system 100 and represented within an operator's graphical display (as described above), alarms may be configured to automatically control the bypass function and an operator may directly control the bypass function from the operator display.

Figure 8:
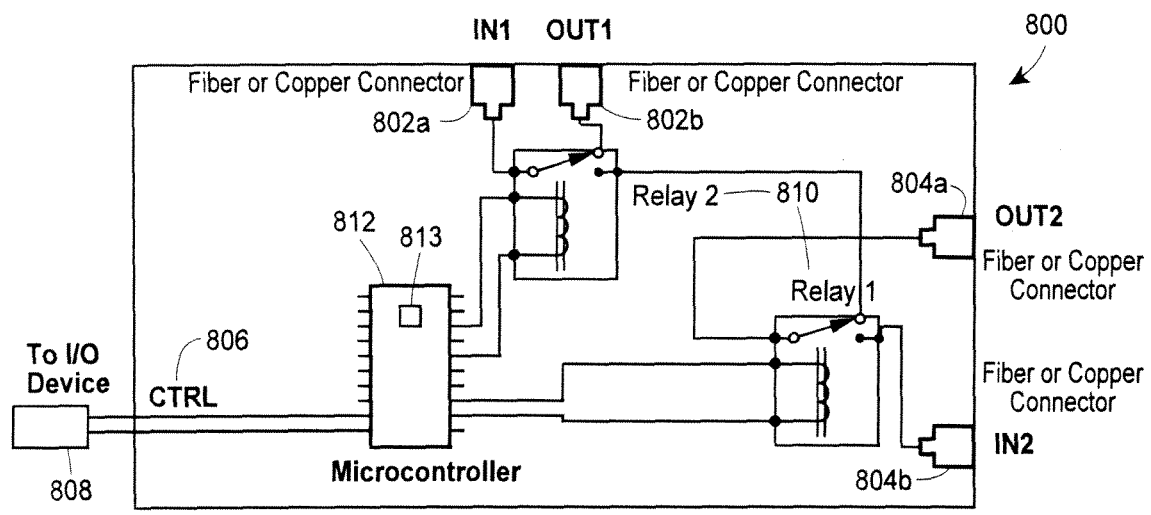
FIG. 8 is a logical block diagram of a UTMS-configured network device for performing a bypass function.
Figure 9:
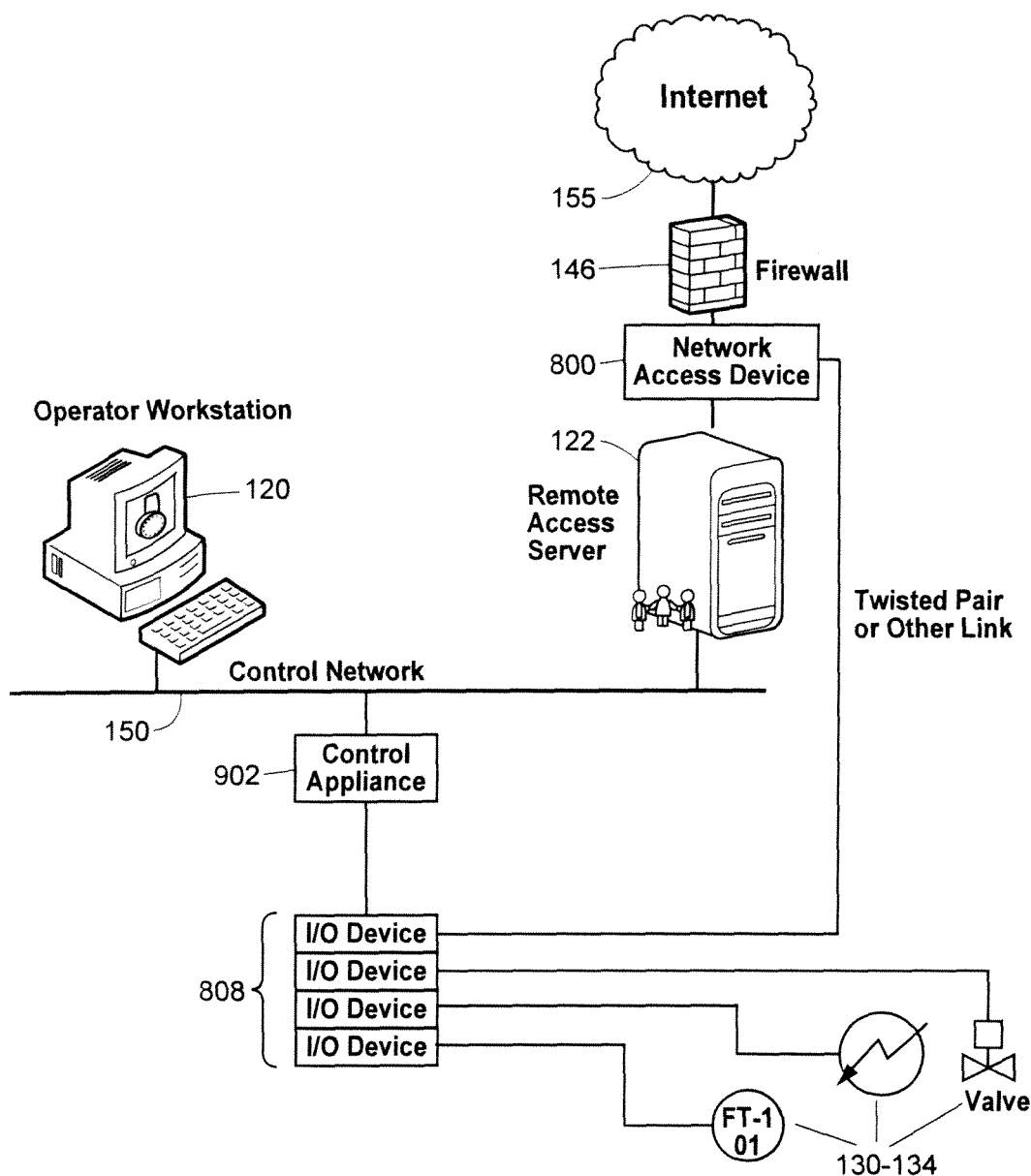
FIG. 9 is a logical block diagram of a process control system including a UTMS-configured network device connected to a control appliance or field device via a I/O Device.

With reference to FIG. 8, one embodiment of a bypass UTMS-configured network access device 800 includes a first type of network connector (e.g., copper, optical, or other connectors) to control network traffic into and out of the device 800 and a second type of network connector to route network traffic directly to the field device 130, 133, 134 or to a control appliance. An IN1 connection 802a and an OUT1 connection 802b describe connectors for a normally active connection from the bypass UTMS-configured network access device 800. An IN2 connection 804a and an OUT2 connection 804b describe connectors for a temporary connection. Actuation of the bypass UTMS-configured network access device 800 may cause the IN1/OUT1 connection 802a/802b to be disrupted to disengage a normally active connection. Actuation of the bypass UTMS-configured network access device 800 may also cause the IN2/OUT2 connection 804a/804b to be engaged to make a temporary connection to bypass another network device (e.g., the firewall 146, as previously described). In some embodiments, a bypass module 813 within the microcontroller 812 may include a computer-readable memory including a sequence of computer-executable instructions to perform the bypass functions described herein. In other embodiments, the bypass functions may be manually performed by a user. By connecting the OUT1/IN2 802b, 804a set to the network device to be bypassed, the IN1 connection 802a and OUT1 connection 802b set of connections may route communications through a network device or may bypass network communications around the same network device when the bypass UTMS-configured network access device 800 is actuated. The second type of connector, such as a CTRL connector 806 may connect a pair of wires or other type of connectors from the UTMS-configured network access device 149 directly to the field devices 130, 133, 134, or through a control appliance 808 to the field devices. The control appliance 808 communicatively couples field devices 130, 133, and 134 to a controller 110 in the process control system 100. In some embodiments, the control appliance 808 is an I/O device such as an I/O module or I/O card 140, a discrete output Characterization Module (CHARM) or termination module as produced by Fisher-Rosemount Systems, Inc. of Austin Tex. Such I/O devices and termination modules are described in U.S. patent application Ser. No. 11/533,259 entitled "Apparatus and Methods to Communicatively Couple Field Devices to Controllers in a Process Control System" to Burr, et al., and is entirely incorporated by reference herein. As illustrated in FIG. 9, the I/O Device 808 may be used to send discrete signals to the device and receive status information via a line fault detection mechanism within the I/O Device and as described in U.S. patent application Ser. No. 11/533,259. Alternatively, an intelligent communication method may be utilized between the I/O Device and the field device. For example, the intelligent communication method may be a HART signal to communicate the status (e.g., whether the communication is engaged or disengaged), with the level of the signal used which may drive the bypass UTMS-configured network access device 800 to the desired state (i.e., connected or not connected).

Further, the bypass UTMS-configured network access device 800 may be connected to the I/O Device 808, as shown in FIG. 9, and the I/O Device 808 may send a pulse output every second to the bypass UTMS-configured network access device 800 to act as a heartbeat. If the bypass UTMS-configured network access device 800 does not receive a heartbeat for a period of time, it may automatically default to a configured failsafe value (e.g., disengaging the temporary connections, disengaging all connections, activating an alarm, etc.). This heartbeat may be initiated from a discrete output I/O Device 808 or it may be automatically initiated from an operator workstation 120 to guarantee that the link between the operator workstation 120 and the I/O Device 808 is still active as well.

Figure 10:
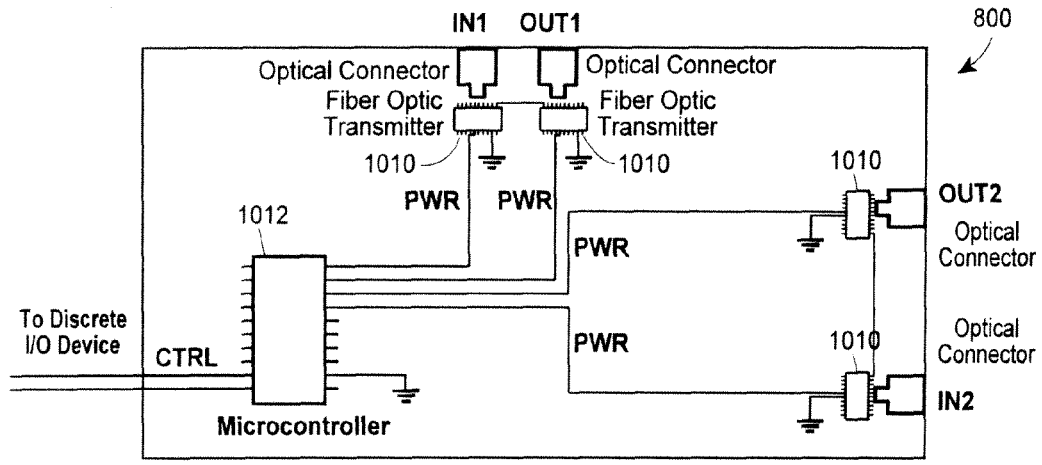
FIG. 10 is a logical block diagram of a UTMS-configured network device for performing a bypass function within a network including optic connectors or other powered connectors.

With reference to FIGS. 8 and 10, the bypass UTMS-configured network access device 800 may have connections that are enabled or directly disabled by relays 810 (FIG. 8) for copper or other types of analog connectors or power-controlling relays to a transmitter and receiver 1010 (FIG. 10) on the fiber optic connectors. For example, a bypass UTMS-configured network access device 800 may include only two network ports and the control circuitry 812, 1012 (or four ports if bypass functionality is not needed, but a single device for both). With two network ports, the connections may be enabled or disabled by turning off power to the optical link circuitry 1010 for fiber-optic connections. The fiber optic transmitters 1010 may be powered directly off a pin on the microcontroller 1012 or may be powered from a common source and the microcontroller 1012 can turn the power on or off using a relay, similar to that shown in FIG. 8. In either case, the bypass UTMS-configured network access device 800 may be connected to a control appliance 902 through a I/O Device.

Figure 11:
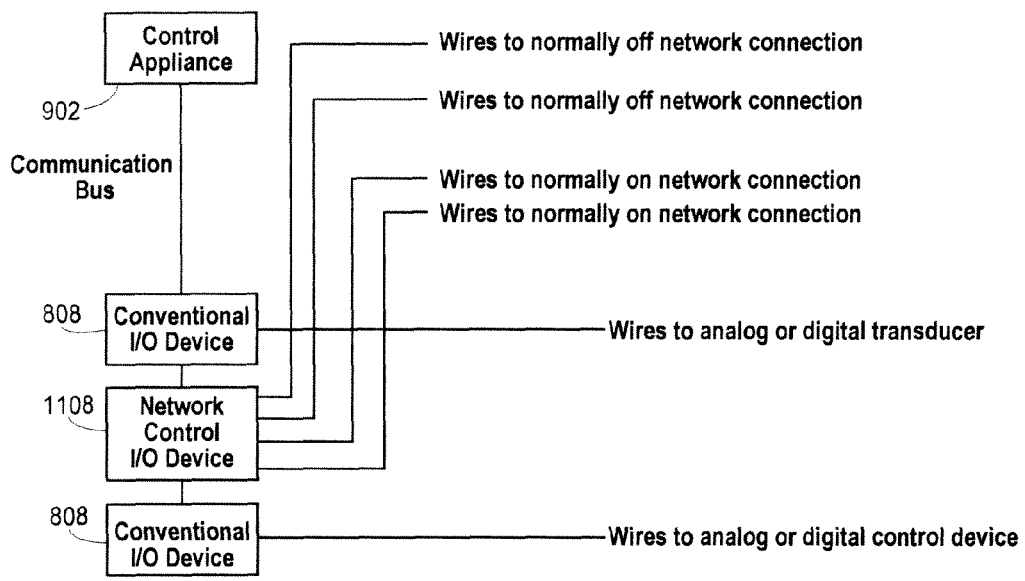
FIG. 11 is a logical block diagram of a portion of a process control system that includes I/O Device that includes UTMS capabilities.
Figure 12:
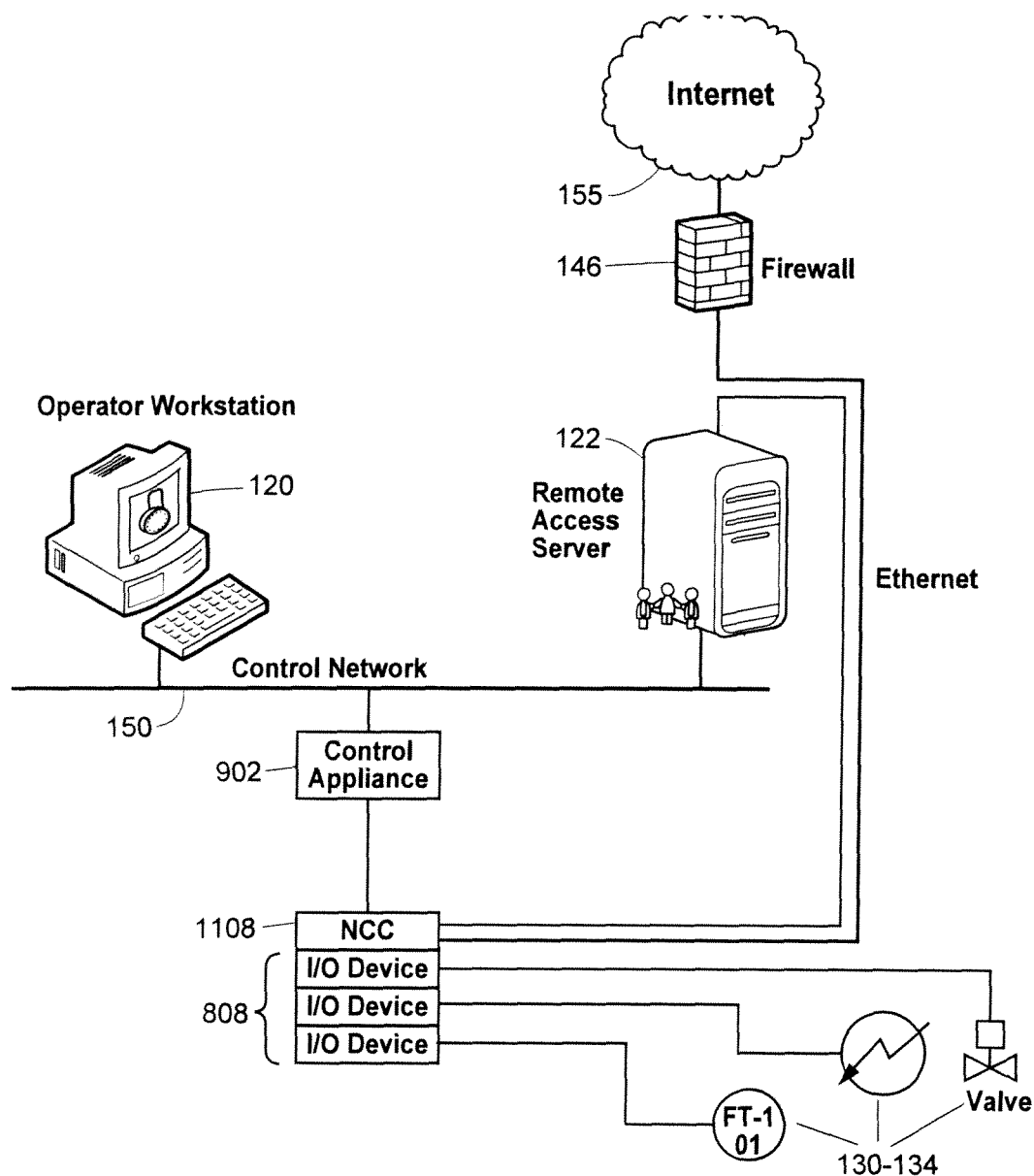
FIG. 12 is a logical block diagram of a process control system including a UTMS-capable I/O Device connected to a control appliance or field device

In another embodiment, the bypass UT MS-configured network access device may, itself, be a I/O Device. With reference to FIGS. 11 and 12, a UTMS-configured I/O Device or Network Control I/O Device (NCC) 1108, may include an on-off switch to physically connect or disconnect an Ethernet, Serial, or other type of link. One or more of these can be installed next to conventional I/O Devices 808 under a control appliance 902. A NCC 1108 may communicate on the same communication bus as conventional I/O Devices 808 to the control appliance 902.

Figure 13:
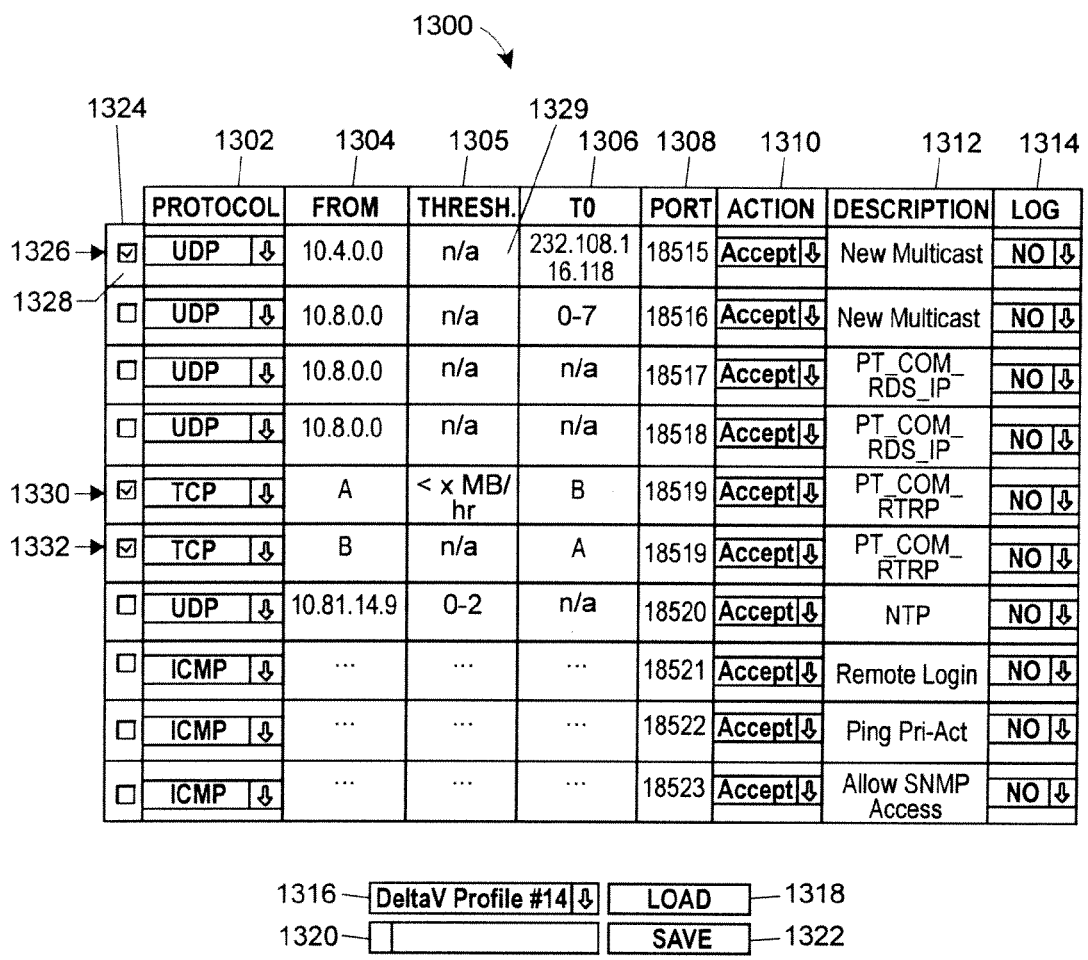
FIG. 13 is a ruleset user interface to configure rules for managing network traffic for the process control system.

The perimeter UTMS-configured devices 146, 149, internal UTMS-configured devices 134, 152, and bypass UTMS-configured network access devices 800 may include any number of additional rule tables to monitor and/or protect a control system 100 from unwanted access and/or malicious attack. For example, a UTMS-configured process object 204e (FIG. 2) may allow a user to access one or more user interfaces to configure and control any of the rules within the rulesets 147, 148, 151, 152 and the network security in the process control system. As illustrated in FIG. 13, a ruleset user interface such as a protocol rule table 1300 may be accessed via the UTMS-configured process object 204e and includes a protocol type column 1302, a from-address column 1304, a threshold parameter column 1305, a to-address column 1306, a port number column 1308, an action column 1310, a description column 1312, and a log column 1314. Protocol types of the example protocol type column 1302 may include, but are not limited to, UDP, TCP, ICMP, HART, and/or SCPI. Addresses in the from-address column 1304 and/or the to-address column 1306 may correspond to one or more addresses associated with a given protocol type. For example, TCP, UDP, and ICMP protocols typically employ IP addresses (e.g., IP v. 4, IP v. 6, etc.), and protocols related to SCPI and/or GPIB include one or more device addresses of differing formats. The UTMS-configured process object 204e may also permit access to the rulesets 147, 148, 151, 152 to create customized rule profiles 232 (FIG. 2), and access rule profiles generated by a manufacturer of process control equipment. Such profiles 232 may be generated to reflect firewall settings that are typically common to users that employ process control and test and measurement equipment by a specific manufacturer. A user may be allowed to load a profile via a profile drop-down selector 232 (when accessing a user interface for a UTMS-configured object 240e) or a profile drop-down selector 1316 (when accessing the ruleset interface or table 1300). Either selector 232 or 1316 may include a load button 1318. However, in the event that a user desires to customize one or more profiles based on, for example, a specific control system topology, the sensitivity of the process that is being controlled by the process control system (e.g., a nuclear reactor, municipal utilities, dangerous or hazardous processes, etc.), one or more user-selectable options within the a protocol rule table UI 1300 may allow the desired customization. Customized profile settings may be saved with a unique profile name entered into an example profile name field 1320 and a corresponding save button 1322.

In operation, each row of the example table 1300 enforces a rule if a corresponding row selector is active, as shown by an example row selection column 1324. A first example row 1326, when activated by virtue of its corresponding row selector 1328, results in the enforcement of a rule that monitors UDP protocol packets from a device associated with address 10.4.0.0 to a device associated with address 232.108.116.118, which includes port number 18515. For such detected communications, the example first row 1326 accepts such communication activity, but does not require logging of such communication activity. While the example rule in the first row 1326 employs IP version 4 addresses, any addressing scheme may be employed including, but not limited to, IP version 6, hardware specific addressing (e.g., GPIB device addresses), and/or human-readable addresses to be referenced against a domain name server. While the example first rule 1326 identifies an action of "accept," other actions may include, but are not limited to, block, notify, and/or re-route.

In the illustrated example of FIG. 13, the first row 1326 permits communications between the from-address and the to-address with no limitation imposed by the threshold column 1305. In other words, because a threshold field 1329 of the first row 1326 is set to "N/A," the network traffic conforming to the remaining entries in row 1326 will not be constrained by the amount, size, or other threshold able to be imposed by that column entry. A second example row 1330 is configured to monitor TCP communications from IP address "A" (e.g., 10.4.0.0) to IP address "B" (e.g., 232.108.116.118) having port number 18519. As long as the amount of network traffic on port number 18519 is less than x-megabytes per hour, the network traffic is accepted. However, if the threshold is exceeded, a log is generated and communications are disabled for violating the threshold. On the other hand, while communications from address "A" to address "B" are confined by virtue of the settings shown in the example second row 1330 (i.e., a threshold setting other than "n/a"), a third example rule row 1332 establishes another rule between the same two addresses, but in the opposite direction. In other words, communications associated with originating address "A" to address "B" are relatively constrained, while communications associated with originating address "B" to address "A" may occur without limitation.

While the example table 1300 affords relatively great flexibility to configure specific rules, an example configuration wizard 1400 GUI of FIG. 14 allows simplified configuration of the perimeter UTMS-configured devices 146, 149, internal UTMS-configured devices 134, 152, and bypass UTMS-configured network access devices 800. The example configuration wizard 1300 allows a user to answer questions and/or select check boxes associated with simple inquiries to the user, thereby affording a user having limited knowledge of general network protection an opportunity to configure a control system with improved effectiveness. Additionally, question scripts may be generated that are unique to the control system 100, particular devices within the system 100, equipment manufacturers, etc. In the illustrated example of FIG. 14, a first check box 1402 is associated with manufacturer Alpha and a second check box 1404 is associated with manufacturer Beta. In the event that a customer/user selects the checkbox associated with manufacturer Alpha, prompts and questions may be generated that are typical of process control systems using equipment manufactured by manufacturer Alpha.

A user may additionally be able to configure the network security of the process control system 100 by manipulating network traffic though each of the perimeter UTMS-configured devices 146, 149, internal UTMS-configured devices 134, 152, and bypass UTMS-configured network access devices 800. In some embodiments, the user may manipulate the network security of the system 100 through one or more GUIs that limit the type of traffic that may be received or sent from a UTMS-configured device. Further, the user may also limit the network traffic according to various areas or subsystems of the process control system 100.

Figure 15:
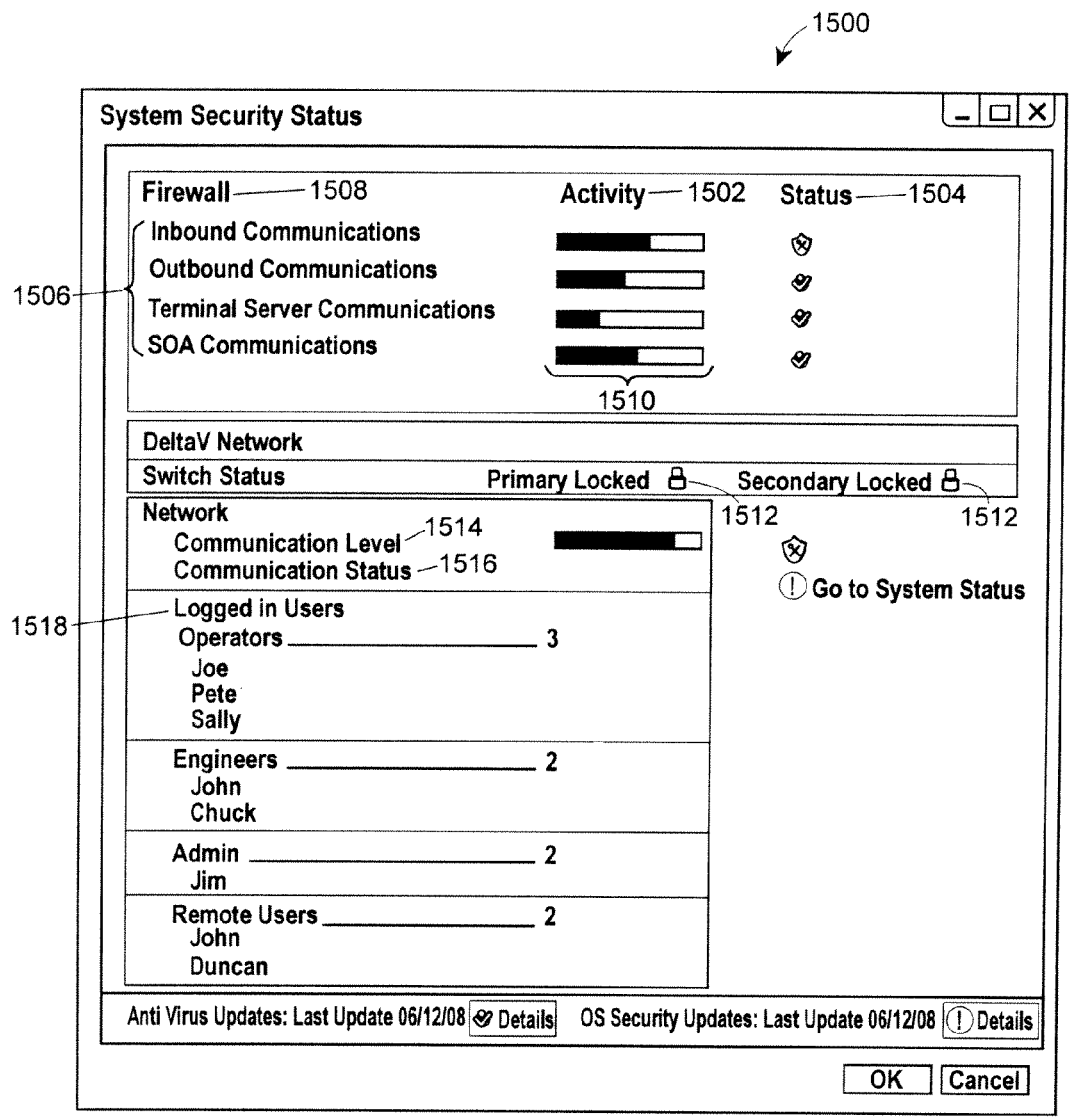
FIG. 15 is a System Security user interface for displaying UTMS security information for the process control system.

With reference to FIG. 15, a user may access a System Security UI 1500 that displays UTMS security information for the process control system 100. For example, the System Security UI 1500 may display information related to a UTMS-configured firewall device 146, 149. The displayed information may include an activity indicator 1502 and status indicator 1504 for different types of communications 1506 that are relevant to the firewall. The activity indicator 1502 may include any sort of value, graph, graphic, and the like that indicates to a user the amount of network traffic at a UTMS-configured device 1508 (e.g., the firewall 146, 149, internal UTMS-configured devices 134, 152, and bypass UTMS-configured network access devices 800) corresponding to the type of communication 1506. In some embodiments, the activity indicator 1502 may include a color-coded bar that, from left to right, transitions from one color to another (e.g., green to red). A length of the color-coded bar activity indicator 1502 corresponds to an amount of network traffic corresponding to a communication type 1506. The permitted length of the activity indicator may be configured to correspond to a permitted threshold 1510 for an amount of network traffic of the corresponding type 1506. The permitted threshold 1510 may be configured by one or more of the rules within the ruleset 147, 148, 151, 152 corresponding to the particular UTMS-configured device 1510 or may be configured by the user. For example, a rule may only permit a specified amount of network traffic over a given amount of time. The permitted threshold 1510, would then be configured automatically to represent that specified amount. During system operation, an activity indicator 1502 that extends from left to right a short distance may be green and indicate a low amount of network traffic at the firewall 146, 149 while a long activity indicator 1502 that extends most or all of the distance permitted within the display may be red and indicate a high amount of network traffic that is nearing the permitted threshold automatically configured by a rule within a ruleset 147, 148, 151, 152 or manually by a user. The status indicator 1504 may indicate whether or not a corresponding communication type 1506 of the device 1508 is functioning or not functioning. Additional status information may be available for the corresponding type of communication 1506 by selecting a status indicator 1504 or other item from the System Security UI 1500.

Additionally, the System Security UI 1500 may include information about the network 150, 135 generally and one or more UTMS-configured devices particularly. For example, the system 100 may include a primary network and one or more secondary networks serving as backup for the primary network(s). Each network may include a UTMS-configured switch that controls network traffic into and out of various areas within the network. The System Security UI 1500 may display whether or not the UTMS-configured switch is locked or unlocked 1512, thus securing each portion of the network according to a default configuration or a user-defined configuration. The System Security UI 1500 may also display an indication of the communication level 1514 of the network as a whole using a graphical indication of the amount of traffic and a threshold level for the amount of permitted network traffic. In some embodiments, the graphical indication is a colored bar, such as described above. In addition to the communication level, the System Security UI 1500 may display a communication status 1516 for the system 100 that may include the log in status 1518 or other information for various types of system users (e.g., operators, engineers, administrators, remote users, etc.). The System Security UI 1500 may display other types of network information including a status of the workstation anti-virus and operating system security updates 1520, an indication of a last ruleset update, or other network security information.

Figure 16:
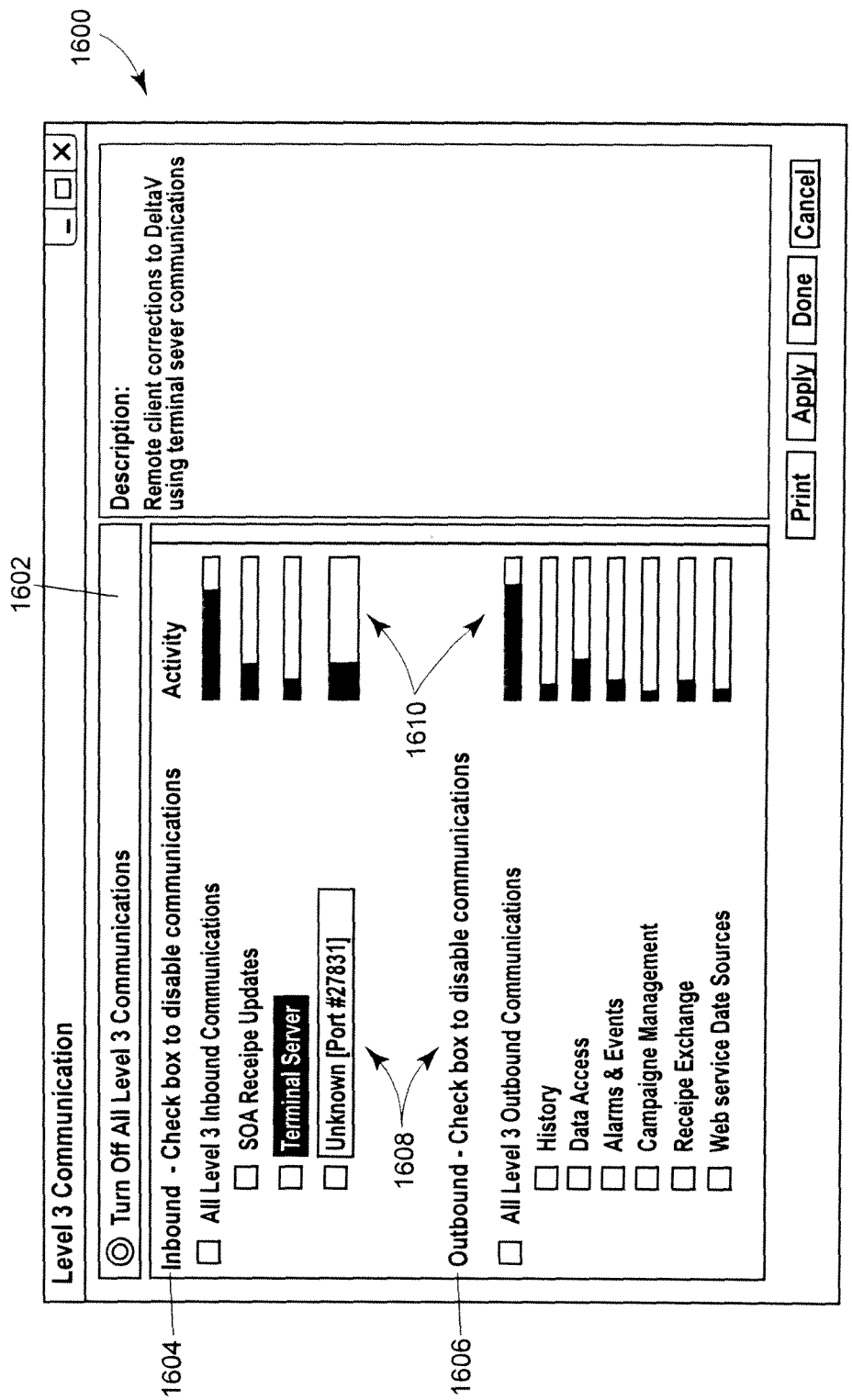
FIG. 16 is a Communication user interface that is communicatively connected to the UTMS-configured devices to manage particular types of network traffic.

Network traffic may be classified according to the particular characteristics of the traffic and a user may access a user interface to configure system communication according to the classification. For example, a user may selectively turn off and turn on various types of communications within the system 100. In some embodiments, the network traffic may be classified by one or more "levels" with increasing sensitivity or security concerns. With reference to FIG. 16, types of network traffic may be classified as "Level 3" (or other level) and a user may selectively configure the UTMS-configured devices of the system 100 using a Level 3 Communication UI 1600 that is communicatively connected to the devices to manage such "Level 3" classified network traffic. For example, Level 1 network traffic may be described as local client connections to the network 150 while Level 3 network traffic may be described as remote client connections to the network 150 using terminal server communications. The user may select a UTMS-configured device from a graphic display to display the UI 1600 within the user workstation or as a detail display from the System Security Status UI 1500. A "panic button" 1602 may permit a user to turn off all communication for a selected type (e.g., all Level 3 communications) and to control various characteristics of network traffic that is inbound 1604 and outbound 1606 of the UTMS-configured device. Each type of network traffic that is classified as "Level 3" 1608 may be individually configured to be enabled or disabled using the UI 1600. Additionally, the Level 3 network traffic 1608 displayed within the UI 1600 may include an indication of network activity 1610 as described above in relation to FIG. 15 (e.g., a color-coded bar, graph, etc.).

Figure 17:
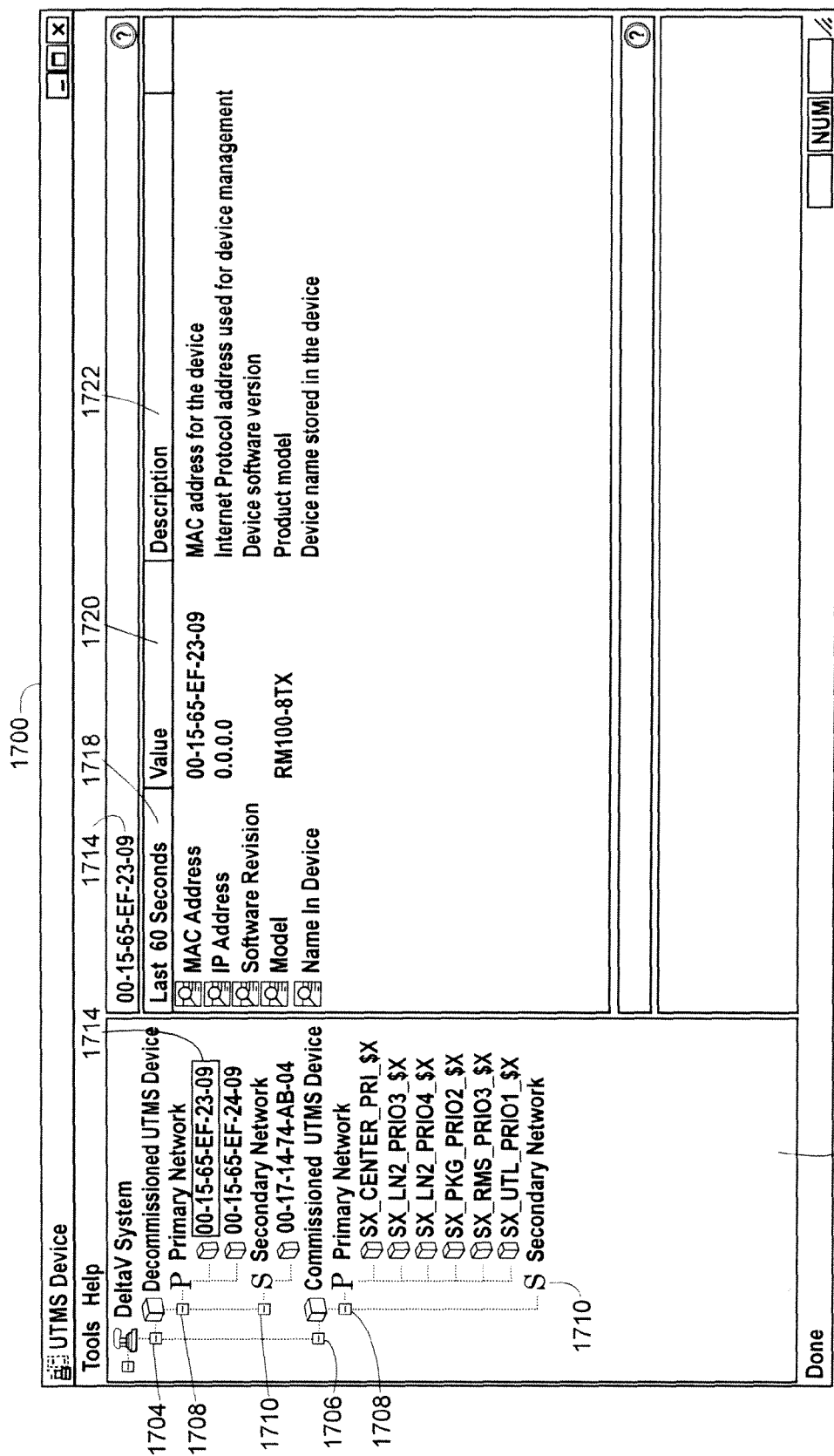
FIG. 17 is a UTMS Device Command Center user interface that is communicatively connected to each UTMS-configured device.

With reference to FIGS. 17-23, a user may also select a view from a process control system explorer application (e.g., a DeltaV™ explorer application) to view the status of each individual UTMS-configured device within the system 100, make various changes to each device, and assist in maintenance of the devices. FIG. 17 illustrates one example of a UTMS Device Command Center UI 1700 that is communicatively connected to each UTMS-configured device (perimeter UTMS-configured devices 146, 149, internal UTMS-configured devices 134, 152, and bypass UTMS-configured network access devices 800, etc.) within the system 100. A first explorer pane 1702 of the UTMS Device Command Center UI 1700 may include a hierarchical listing of each UTMS-configured device within the system 100 and may be grouped according to various similar characteristics (e.g., by subsystem, primary or secondary network, process task, etc.). The system 100 may include one or more Decommissioned 1704 and Commissioned 1706 UTMS devices within respective primary 1708 and secondary 1710 networks, as previously described. Decommissioned UTMS-configured devices 1704 may be those devices that are still physically located within the network 150, but are no longer enabled or needed within the system 100. For example, as portions of the process control system become obsolete or outdated, those outdated portions may be selectively decommissioned and brought "off line" so that they are no longer an active part of the system 100, but are still physically present within the system 100. Selection of any of the UTMS-configured devices listed in the explorer pane 1702 (e.g., UTMS-configured device 1714) may display several characteristics about the device 1714 within a second explorer pane 1716 including its state within the system 100. For example, the characteristics displayed within the pane 1716 may include characteristics evaluated within a previous time period 1718 (e.g., the last sixty seconds, the last 30 minutes, etc.) including the MAC address, the IP address, Software Version, Device Model, and Device Name. Each value 1720 for the characteristic may be displayed within visual proximity to the characteristic 1718 as well as a description 1722 of each characteristic 1718.

Figure 18:
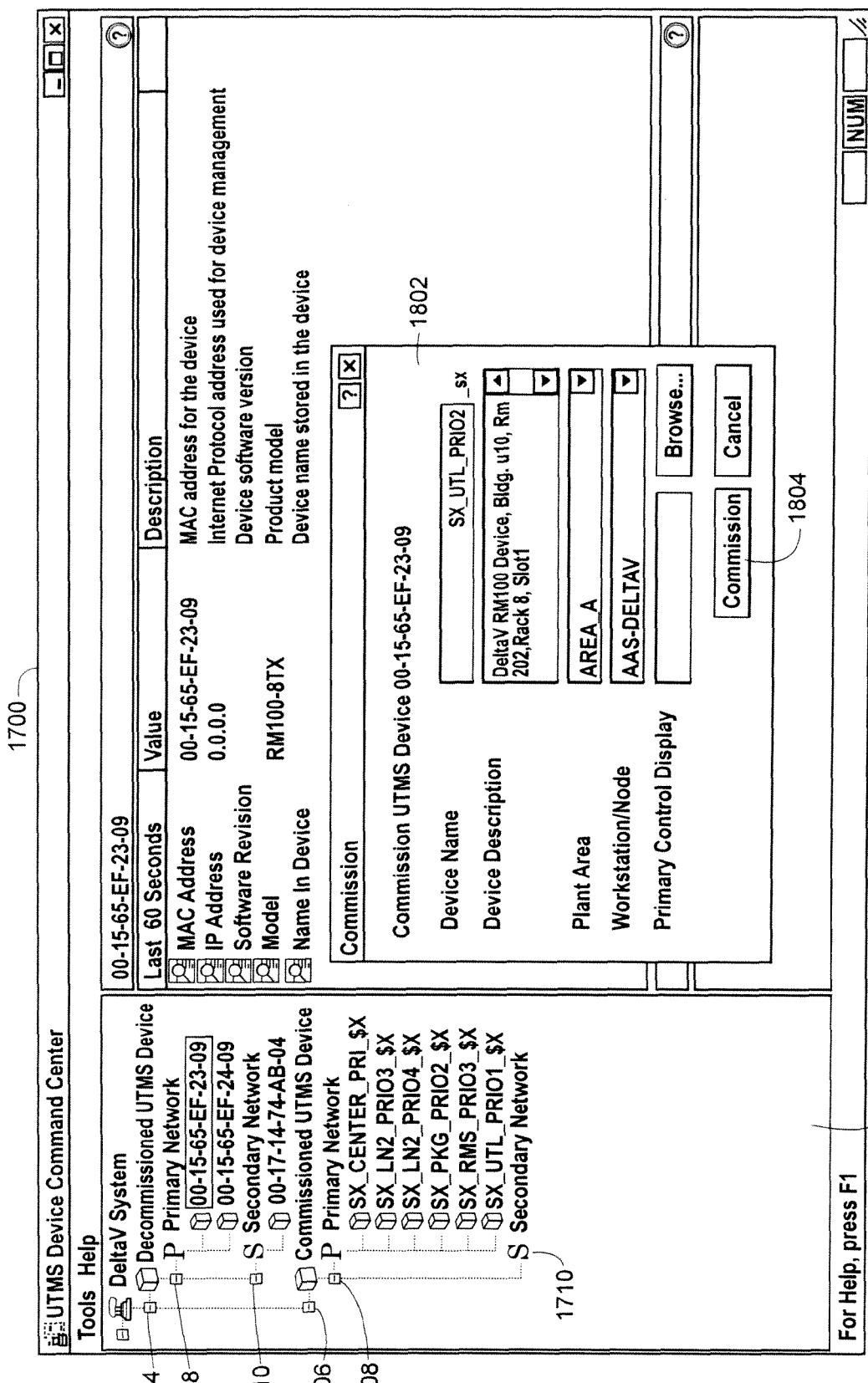
FIG. 18 is a UTMS Device Command Center user interface including a commission/decommission window.

With reference to FIG. 18, selection of any of the decommissioned UTMS-configured devices 1704 may display a Commission window 1802 to allow a user to view various characteristics of the device and, using the "commission" button 1804, to selectively bring the selected decommissioned UTMS-configured device back online. Once online, the re-commissioned UTMS-configured device may automatically perform an update of its ruleset or request a current ruleset from a connected UTMS-configured device or the Internet, and assume network traffic communication according to the current ruleset.

Figure 19:
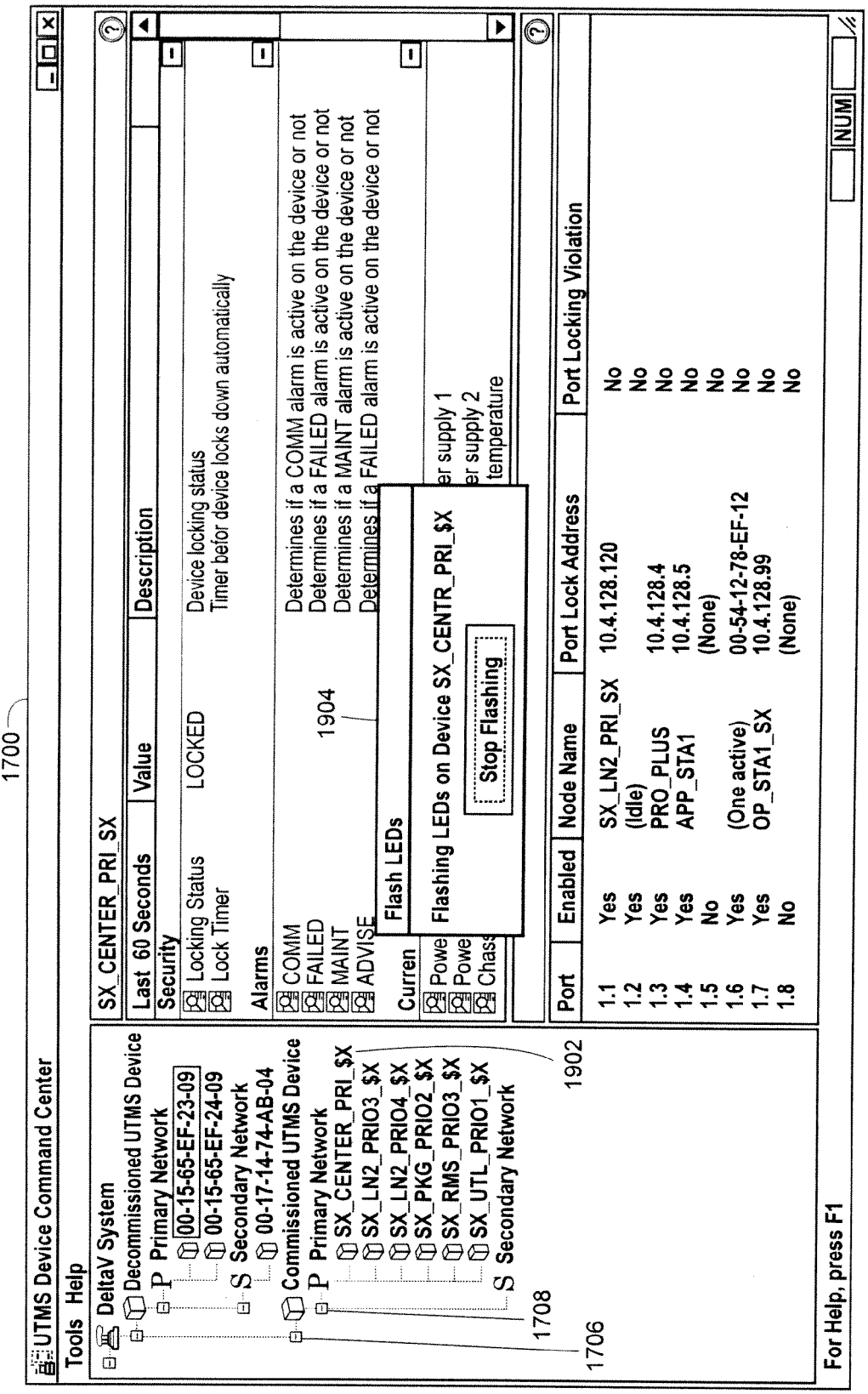
FIG. 19 is a UTMS Device Command Center user interface including a maintenance assistance window.

With reference to FIG. 19, selecting a UTMS-configured device 1902 from the commissioned devices may permit a user to assist in maintenance for the selected device 1902 by changing a physical characteristic of the selected device 1902 to allow maintenance personnel to physically locate the selected device 1902. In some embodiments, a maintenance assistance window 1904 may permit a user to selectively indicate and not indicate a physical location of the selected device by causing LEDs on the device to flash. Other selectable indicia may include sound, vibration, or other noticeable physical changes to the selected device.

Figure 20:
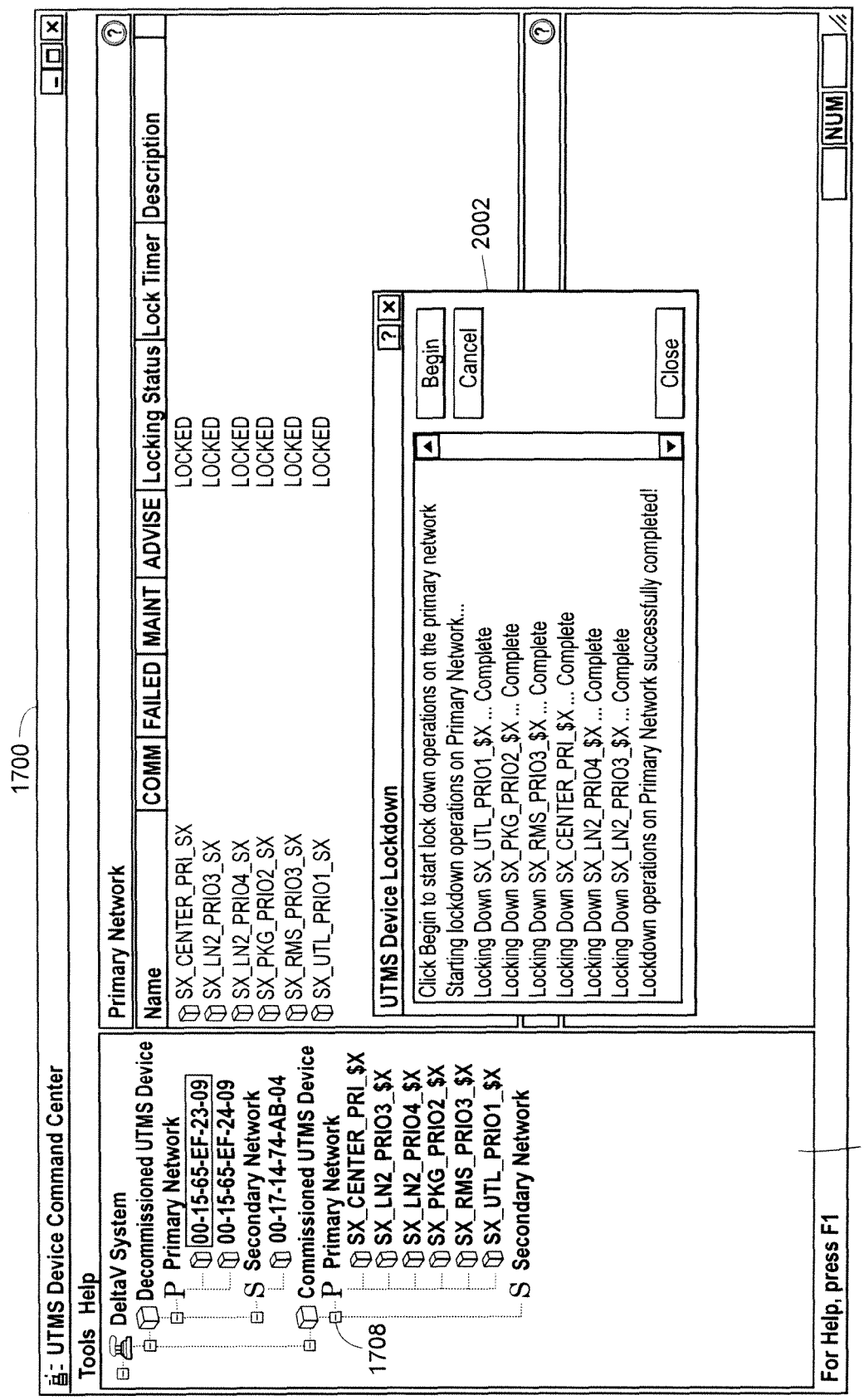
FIG. 20 is a UTMS Device Command Center user interface including an action window.

With reference to FIG. 20, a user may select any portion of the system 100 from the explorer pane 1702 to initiate a security-related action on that selected portion. For example, a user may select the primary network 1708 from the pane 1702 and select an option to initiate a "lockdown" of that portion of the network. In some embodiments, a lockdown action disables inbound and outbound communication to the selected portion of the system 100. Initiating an action on a portion of the system from the pane 1702 (e.g., a lockdown action) may display an action window 2002 that indicates which portion of the system 100 is undergoing the action (e.g., lockdown) and the progress of the initiated action.

Figure 21:
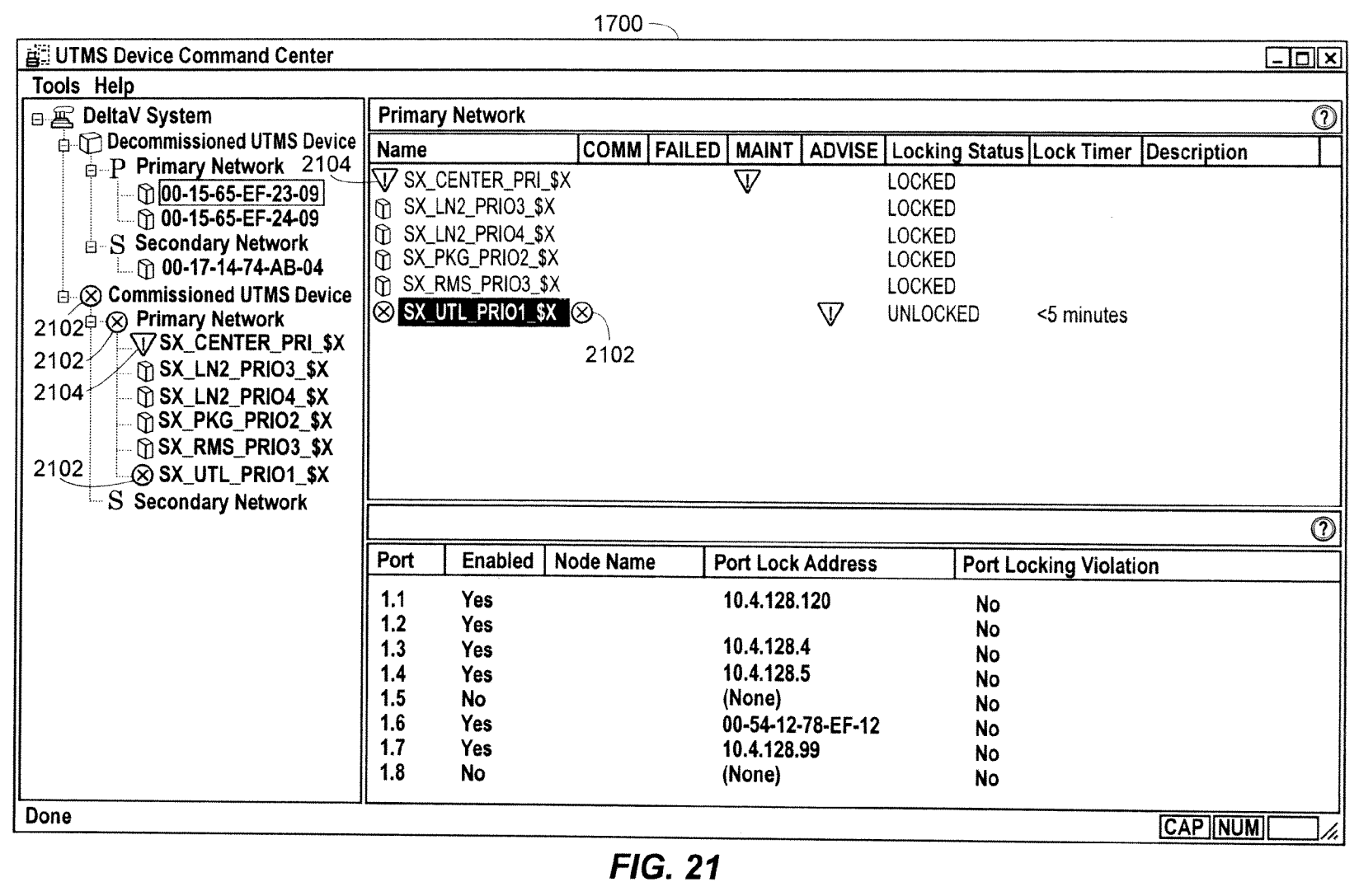

With reference to FIG. 21, the UTMS Device Command Center UI 1700 may also indicate security breaches or other rules violations. For example, if a UTMS-configured device violates a rule of a corresponding ruleset 147, 148, 151, 152 (e.g., the device has been unlocked for an amount of time exceeding a default or configured threshold), a rule violation indication 2102 may appear next to the name of the device and the name of each category to which the device belongs. Furthermore, if the system 100 determines that a UTMS-configured device is about to violate a rule of a corresponding ruleset 147, 148, 151, 152, then a projected rule violation indication 2104 may also appear next to the name of the device and the name of each category to which the device belongs. Where more than one device within a parent category includes a rule violation indication, then the more severe of the violations may be displayed next to the parent category of the two devices. For example, when the primary network includes a first UTMS device that is projected to violate a rule and a second UTMS-configured device that has actually violated a rule, only the indication of the actual rule violation may be displayed.

Figure 22:
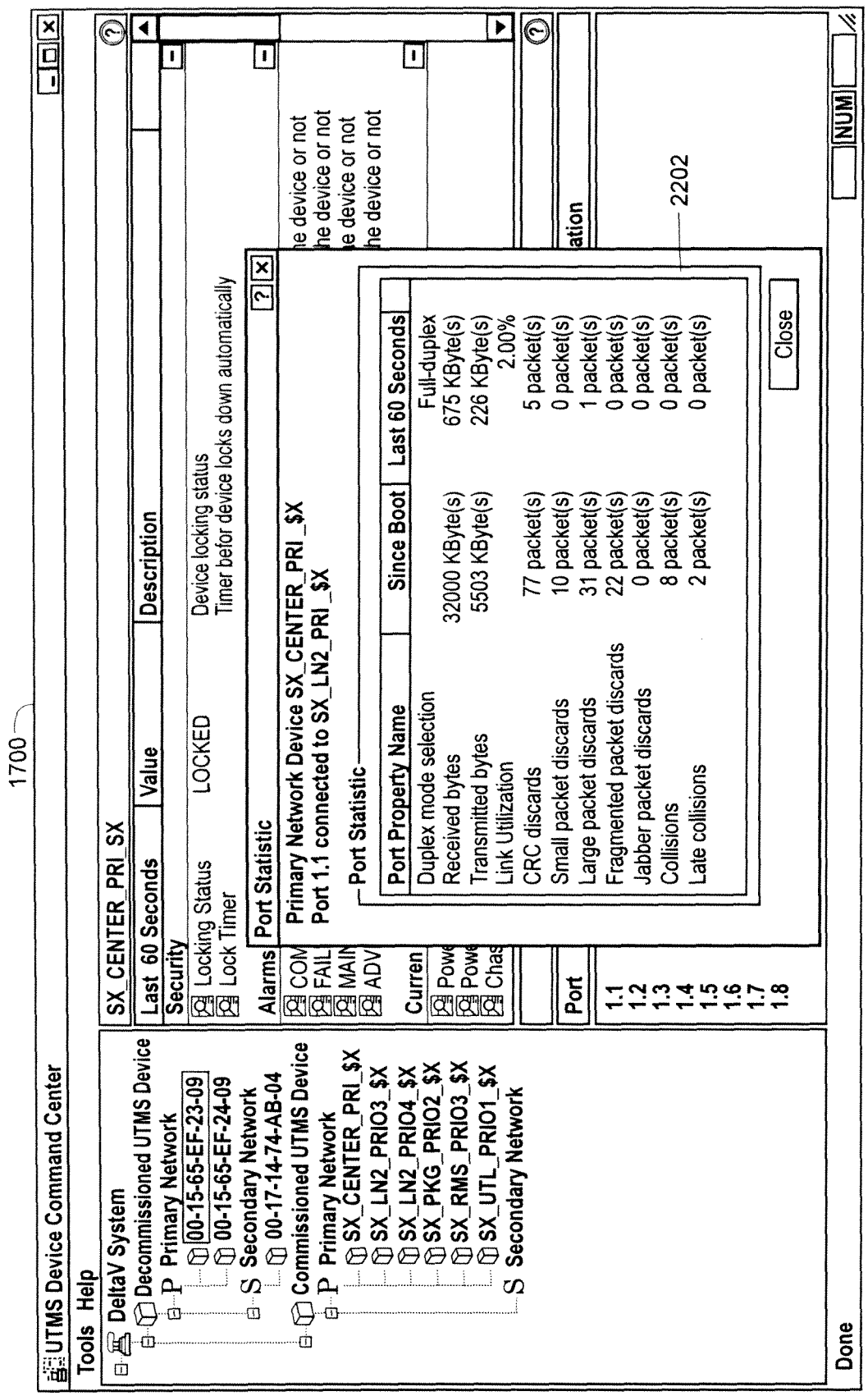
FIG. 22 is a UTMS Device Command Center user interface including a port statistics window for a selected UTMS-configured device.

With reference to FIG. 22, various port statistics 2202 for the selected UTMS-configured device may also be displayed after selecting a UTMS-configured device from the pane 1702 of the UTMS Device Command Center UI 1700. The port statistics 2202 displayed in the window may include various port properties over an amount of time. For example, the port properties of Received and Transmitted bytes may be tracked since boot of the UTMS-configured device, an amount in the previous sixty seconds, or some other configurable amount of time, and the value displayed. Of course, other port properties may be tracked and displayed including duplex mode selection, link utilization, CRC discards, small packet discards, large packet discards, fragmented packet discards, jabber packet discards, collisions, and late collisions, to name only a few port properties.

With reference to FIG. 23, in addition to the rule violations and network security violations described above in relation to FIG. 21, alarm information 2302 may also be displayed and described within the second pane 1716. When a UTMS-configured device (e.g., UTMS-configured device 2304) experiences an operational problem, or the rule and network security violations described above, an alarm indication 2306 may be displayed within visual proximity of the device name displayed within the first explorer pane 1702. Alarm information may then be displayed in each of the characteristic 1718, value 1720, and description 1722 columns of the second explorer pane 1716. The alarm information 2302 may indicate one or more of a communications alarm, a failed alarm, a maintenance alarm, or an advisory alarm that is causing the alarm indication 2306. In addition to the alarm information 2302, the second pane 1716 may also display the status 2308 and device information 2310 associated with the selected device 2304. The current status may list the status of particular device characteristics that are likely to be related to the alarm. Further, the device information 2310 may display general information about the selected device 2304 similar to the characteristics described above in relation to FIG. 17.

With user interfaces (FIGS. 13-23) for the UTMS-configured process object 204e (as displayed within one or more of the graphic displays 129 described above), users may both configure and monitor the network security of the process control system through an operator or other workstation 120-122 in response to the security needs of the process, any generated alarms, and other UTMS events. While the UTMS-configured network devices 134, 146, 149, 152 and the techniques employing the UTMS in general have been described herein as being used in conjunction with Fieldbus and standard 4 20 ma devices, they can, of course, be implemented using any other process control communication protocol or programming environment and may be used with any other types of devices, function blocks or controllers. Although the UTMS devices and routines described herein are preferably implemented in software, they may be implemented in hardware, firmware, etc., and may be executed by any other processor associated with a process control system. Thus, the methods described herein may be implemented in a standard multi purpose CPU or on specifically designed hardware or firmware such as, for example, ASICs, if so desired. When implemented in software, the software may be stored in any computer readable memory such as on a magnetic disk, a laser disk, an optical disk, or other storage medium, in a RAM or ROM of a computer or processor, etc. Likewise, this software may be delivered to a user or to a process control system via any known or desired delivery method including, for example, on a computer readable disk or other transportable computer storage mechanism or modulated over a communication channel such as a telephone line, the internet, etc. (which is viewed as being the same as or interchangeable with providing such software via a transportable storage medium). Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed:

1. A method for securing network traffic in a process control system comprising:
providing an operator interface to display and configure various characteristics of both a network access device and a process control device, wherein the network access device facilitates data transmission over a process control system network without changing underlying data communicated over the process control system network, and the process control device changes the data communicated over the process control system network;
instantiating an object having a programmable interface to the network access device and the process control device, the object having access to a ruleset including one or more rules defining a condition to accept or deny network traffic received at the network access device, the network traffic originating externally from the process control system and attempting to communicate control information through the network access device to control the process control device;
determining which of the one or more rules of the ruleset to apply to the instantiated object;
securing the process control device by applying the one or more determined rules to the instantiated object to control the network access device to accept or deny the network traffic received at the network access device;
monitoring the network traffic received at the network access device using the instantiated object; and
in response to determining that the network traffic received at the network access device violates one or more of the rules applied to the instantiated object, denying the network traffic access to the secured process control device and displaying an alarm in the operator interface.

2. The method of claim 1, wherein the object is integrated as a process variable in a process control environment of the process control system.

3. The method of claim 1, wherein the object includes a Unified Threat Management System (UTMS) object and the network access device includes a Unified Threat Management System (UTMS) device.

4. The method of claim 3, wherein the UTMS is one of a Network Intrusion Detection System (NIDS) or a Host Intrusion Detection System (HIDS).

5. The method of claim 1, further comprising storing the ruleset at the network access device and storing a subset of the ruleset at another device.

6. The method of claim 1, wherein the network access device includes one or more of a firewall, a network device, or a field device.

7. The method of claim 1, wherein the object includes a data store for storing variable or changing data describing the network access device, the data including one or more of state data, parameter data, status data, input data, output data, ruleset data, and cost data.

8. The method of claim 1, further comprising receiving the ruleset at the network access device.

9. The method of claim 8, further comprising the object algorithmically determining which of the one or more rules of the ruleset apply to another device of the process control system, the other device providing access to network traffic for a sub-system of the process control system.

10. The method of claim 9, further comprising receiving the algorithmically determined one or more rules at the other device to secure the sub-system of the process control system.

11. The method of claim 1, wherein determining if the network traffic received at the secured process control device violates one or more of the rules applied to the secured process control device includes comparing the incoming network traffic to the determined rules of the ruleset.

12. The method of claim 1, wherein securing the process control device by applying the one or more determined rules to the network access device comprises one of a user configuring the object within a graphic display of the process control system to secure the process control device and automatically configuring the object to secure the process control device.

13. The method of claim 12, wherein the user authenticates an ability to configure the object if the user configures the object within a graphic display of the process control system, the user authentication including an inbuild, two-factor authentication method of the secured process control device.

14. The method of claim 1, further comprising using the object to track statistics related to the network traffic received at the network access device.

15. The method of claim 1, further comprising determining a status of the network access device including a number and type of internal and external data connections to the process control system.

16. The method of claim 1, wherein determining which of the one or more rules of the ruleset to apply to the network access device comprises determining a security profile for the network access device, the security profile securing a sub-system of the process control system.

17. The method of claim 1, further comprising detecting an update of another device within the process control system and displaying an alarm in the operator interface, the alarm indicating the update and recommending a user request an update of the ruleset.

18. The method of claim 1, wherein determining if the network traffic received at the secured process control device violates one or more of the rules applied to the secured process control device includes determining a current operating state of the process control device and one or more of determining if the current operating state includes an unexpected increase in network traffic or type of network traffic at the process control device, determining if the current operating state includes a known fault-inducing attack on the process control system, and determining if the current operating state includes a software, firmware, or configuration change of another device in the process control system.

19. The method of claim 1, further comprising updating the ruleset by collecting threat data from a plurality of sources, constructing the ruleset, validating the ruleset, and distributing the ruleset to the network access device.

20. The method of claim 19, wherein the network access device determines which rules of the ruleset are appropriate for one or more of subsystems and other devices of the process control system and the network access device distributes the determined rules to the appropriate subsystems and other devices.

21. The method of claim 1, wherein the network access device bypasses another device of the process control system that is upstream of the network access device to allow less secure data access to the network access device.

22. The method of claim 21, wherein the network access device bypasses another device of the process control system for an amount or time that is set by a user or set by default.

23. The method of claim 22, wherein the network access device is an I/O Device.

24. A network device for securing network traffic in a process control system comprising:
- a first network connector to communicate network traffic into and out of the network device;
- a second network connector to communicate network traffic to a control appliance of the process control system, wherein the control appliance controls equipment within a process plant and wherein the network traffic attempts to communicate control information through the network device to control the control appliance;
- a ruleset including one or more rules defining a condition to accept or deny network traffic received at the network device;
- a comparison routine to determine if network traffic communicated to the network device violates one or more rules of the ruleset;
- an operator interface routine to display and configure various characteristics of both the network device and the control appliance in an operator interface, wherein the network device facilitates data transmission over a process control system network without changing underlying data communicated over the process control system network, and the control appliance changes the data communicated over the process control system network, and wherein the operator interface routine has access to the ruleset; and
- a security routine to control the network device based upon a determination of the comparison routine to deny access of the network traffic to the control appliance or another device of the process control system and to cause an alarm to be displayed with an illustration of the control appliance that corresponds to the alarm in the operator interface of the process control system.

25. The network device of claim 24, wherein the network traffic originates externally from the process control system and seeks access to the process control system.

26. The network device of claim 24, further comprising a ruleset determining routine to determine which of the one or more rules of the ruleset to apply to the network device.

27. The network device of claim 24, wherein the security routine further denies the network traffic access to the control appliance or another device of the process control system by initiating a bypass routine if the network traffic received at the first network connector violates one or more of the rule, the bypass routine one or more of disengaging a temporary connection to the control appliance, disengaging all connections to the control appliance, and activating an alarm.

28. The network device of claim 27, wherein the bypass routine receives a heartbeat signal from the control appliance and if the bypass routine does not receive the heartbeat signal for a period of time, one or more of disengages a temporary connection, disengages all connections, and activates an alarm.

29. The network device of claim 27, wherein the bypass routine bypasses another device of the process control system that is upstream of the network device to allow less secure data access to the network device.

30. The network device of claim 27, wherein the bypass routine enables or disables one or more relays to disrupt either power or signal transmission to the first or second network connector.

31. The network device of claim 24, wherein the control appliance is an I/O Device.

32. The network device of claim 24, wherein the network device is one of a Network Intrusion Detection System (NIDS) or a Host Intrusion Detection System (HIDS).

33. The network device of claim 24, wherein the ruleset is stored at the network device and a subset of the ruleset is stored at another device.

34. The network device of claim 24, wherein the network device includes one or more of a firewall or a field device.

35. The network device of claim 24, further comprising a data store for storing variable or changing data describing the network device, the data including one or more of state data, parameter data, status data, input data, output data, ruleset data, and cost data.

36. The network device of claim 24, wherein the security routine algorithmically determines which of the one or more rules of the ruleset to apply to another network device of the process control system, the other network device providing access to network traffic for a sub-system of the process control system.

37. The network device of claim 24, further comprising an inbuild, two-factor authentication routine.

38. The network device of claim 24, further comprising an update detection routine to detect an update of another device within the process control system and displaying an alarm in the operator interface, the alarm indicating the update and recommending a user request an update of the ruleset.

39. The network device of claim 24, wherein the security routine determines a current operating state of the network device and one or more of determine if the current operating state includes an unexpected increase in network traffic or the type of network traffic at the network device, determine if the current operating state includes a known fault-inducing attack on the process control system, and determine if the current operating state includes a software, firmware, or configuration change of another device in the process control system.

40. The network device of claim 24, wherein the security routine updates the ruleset by: collecting threat data from a plurality of sources, constructing the ruleset, validating the ruleset, and distributing the ruleset to the network device; determines which rules of the ruleset are appropriate for subsystems of the process control system, and distributes the determined rules to the appropriate subsystems.

41. A unified threat management system for securing network traffic in a process control system comprising:
- a plurality of network devices that receive network traffic related to the process control system, wherein at least one of the network devices receives a ruleset from a source that is external to the process control system, the ruleset including one or more rules defining a condition to accept or deny the network traffic received at least one of the plurality of network devices, wherein the network traffic attempts to communicate control information through at least one of the network devices to control at least one of a plurality of process control devices; and
- a graphical process control environment for graphically representing and configuring elements of the process control system including the plurality of network devices, the plurality of process control devices, and a state of a network traffic connection to each of the plurality of network devices;
- wherein the graphical process control environment:
  - provides an operator interface to display and configure various characteristics of both the plurality of network devices and the plurality of process control devices, wherein the network devices facilitate data transmission over a process control system network without changing underlying data communicated over the process control system network, and the process control devices change the data communicated over the process control system network, instantiates an object for each of the plurality of network devices, each object graphically representing a different network device of the plurality of network devices and having a programmable interface to configure one or more parameters of the network device that the object represents, the parameters including one or more of the state of the network traffic connection to each of the plurality of network devices, the ruleset, and a ruleset update, and secures at least one of the plurality of process control devices by applying at least one of the one or more rules to the instantiated object for at least one of the plurality of network devices to control the at least one of the plurality of network devices to accept or deny the network traffic received at the at least one of the plurality of network devices.

42. The unified threat management system of claim 41, wherein the network device that receives the ruleset algorithmically derives one or more individual rulesets for other network devices, the individual rulesets each being subsets of the ruleset and configurable using the graphical process control environment.

43. The unified threat management system of claim 41, wherein the condition to accept or deny the network traffic received at the network device includes whether the network traffic originates internally or externally from the process control system.

44. The unified threat management system of claim 41, wherein the state of the connection to each of the plurality of network devices includes one or more of a number of connections to the network device and whether or not the connections are active or inactive and communicating or not communicating.

45. The unified threat management system of claim 41, wherein the graphical process control environment is a DeltaV™ graphical process control environment.

46. The unified threat management system of claim 41, wherein the object is integrated as a process variable in the graphical process control environment.

47. The unified threat management system of claim 41, wherein the unified threat management system is one of a Network Intrusion Detection System (NIDS) or a Host Intrusion Detection System (HIDS).

48. The unified threat management system of claim method of claim 41, wherein the network device includes one or more of a firewall and a field device.

49. The unified threat management system of claim 41, wherein the object includes a data store for storing variable or changing data describing the network device, the data including one or more of state data, parameter data, status data, input data, output data, ruleset data, and cost data.

50. The unified threat management system of claim 41, wherein the object compares network traffic to the ruleset and, if the network traffic received at the network device violates one or more of the rules, to deny the network traffic received at the network device and to cause an alarm to be displayed in an operator interface of the graphical process control environment, wherein the network traffic is received by the network device.

51. The unified threat management system of claim 41, wherein the object secures the network device by one of a user configuring the object within a graphic display of the graphical process control environment and configuring the object to automatically secure the network device.

52. The unified threat management system of claim 51, wherein the user configuring the object within a graphic display of the graphical process control environment requires user authentication via an inbuild, two-factor authentication method of the process control system.

53. The unified threat management system of claim 41, wherein the object tracks statistics related to the network traffic received at the network device.

54. The unified threat management system of claim 41, wherein the object determines a security profile for the network device, the security profile for securing a subsystem of the process control system.

55. The unified threat management system of claim 41, wherein the object detects an update of another network device within the process control system and to display an alarm in a graphical display of the graphical process control environment, the alarm indicating the update and recommending a user request an update of the ruleset.

56. The unified threat management system of claim 41, wherein the object determines if the network traffic received at the network device violates one or more of the rules.

57. The unified threat management system of claim 41, wherein the object updates the ruleset by collecting threat data from a plurality of sources, constructing the ruleset, validating the ruleset, and distributing a subset of the ruleset to other network devices, each other network device corresponding to a subsystem of the process control system.

58. The unified threat management system of claim 41, wherein the one or more parameters includes a function to bypass another network device of the process control system for a configurable amount of time.

59. The unified threat management system of claim 41, wherein the network device is an I/O Device.

* * * * *